US012223582B2

(12) United States Patent
Crowley et al.

(10) Patent No.: US 12,223,582 B2
(45) Date of Patent: Feb. 11, 2025

(54) ITERATIVE RAY-TRACING FOR AUTOSCALING OF OBLIQUE IONOGRAMS

(71) Applicant: Atmospheric & Space Technology Research Associates, L.L.C., Louisville, CO (US)

(72) Inventors: Geoffrey Crowley, Lafayette, CO (US); Timothy M. Duly, Westminster, CO (US); Clive Winkler, Superior, CO (US); Syed Irfan Azeem, Louisville, CO (US)

(73) Assignee: Atmospheric & Space Technology Research Associates, L.L.C., Louisville, CO (US)

( * ) Notice: Subject to any disclaimer, the term of this patent is extended or adjusted under 35 U.S.C. 154(b) by 0 days.

(21) Appl. No.: 18/097,432

(22) Filed: Jan. 16, 2023

(65) Prior Publication Data

US 2023/0206545 A1    Jun. 29, 2023

Related U.S. Application Data

(62) Division of application No. 15/553,169, filed as application No. PCT/US2016/019570 on Feb. 25, 2016, now Pat. No. 11,557,079.

(60) Provisional application No. 62/120,854, filed on Feb. 25, 2015.

(51) Int. Cl.
    *G06T 15/06*     (2011.01)
    *G06T 11/20*     (2006.01)

(52) U.S. Cl.
    CPC ............ *G06T 15/06* (2013.01); *G06T 11/206* (2013.01); *G06T 2215/16* (2013.01)

(58) Field of Classification Search
    CPC ... G06T 15/06; G06T 11/206; G06T 2215/16; G06T 5/70
    See application file for complete search history.

(56) References Cited

U.S. PATENT DOCUMENTS

| 7,541,967 B2 * | 6/2009 | Sojka ................... G01S 13/951 342/26 R |
| 2007/0083114 A1 | 4/2007 | Yang et al. |
| 2012/0213430 A1 | 8/2012 | Nutter et al. |

FOREIGN PATENT DOCUMENTS

| JP | 2012237705 A | 12/2012 |
| WO | 2016138268 A1 | 9/2016 |

OTHER PUBLICATIONS

Nicholas J. Redding, "Image Understanding of Oblique Ionograms: The Autoscaling Problem," Nov. 18, 1996, Australian New Zealand Conference on Intelligent Information Systems, pp. 1-6. (Year: 1996).*

(Continued)

*Primary Examiner* — Mohamed Charioui
*Assistant Examiner* — Christine Y Liao
(74) *Attorney, Agent, or Firm* — Morrison & Foerster LLP

(57) ABSTRACT

This invention relates generally to ionogram image processing, autoscaling and inversion systems and methods for ionospheric monitoring, modeling, and estimation of the same. One advantage of the present invention is to provide a system, e.g., a lightweight, low-power, and fully-autonomous ionospheric monitoring system that is able to provide fully processed and highly accurate ionosphere characterization in near real-time over a low data-rate satellite link.

4 Claims, 19 Drawing Sheets

(56) References Cited

OTHER PUBLICATIONS

Yong-Min Lee, Moon-Hee You, Jin-Ho Jo, Cheol-Oh Jeong, "Ionospheric Electron Density Profiles Derived from Obliquely Sounded HF Radar," Jun. 16, 2014, IEEE Conference Publication, pp. 1-4. (Year: 2014).*

Yong-Min Lee, Moon-Hee You, Jin-Ho Jo, Cheol-Oh Jeong, "Ionospheric Electron Density Profiles Derived from Obliquely Sounded HF Radar," Jun. 16, 2014, IEEE Conference Publication, Citation Page. (Year: 2014).*

Argo, P. E., et al., "TRACKER: A Three-dimensional Raytracing Program for Ionospheric Radio Propagation," NASA STI/Recon Technical Report N, 1994.

Basu et al., "Ionospheric Radio Wave Propagation," NOAA, Publication [online]. 1985, [retrieved Apr. 18, 2016]. Retrieved from the Internet: , pp. 1-99.

Davies K., "Ionospheric Radio", IEEE electromagnetic waves series, Peregrinus, 1990, 37 pages.

European Search Report for European Application No. 16756362.6 dated Oct. 15, 2018, 8 pages.

Fabrizio G.A., "High Frequency Over-the-Horizon Radar: Fundamental Principles, Signal Processing, and Practical Applications," McGraw-Hill Education, 2013, 77 pages.

Galkin I. A., et al., "The ARTIST 5, in Radio Sounding and Plasma Physics," A1P Conf Proc.974, 2008, 11 pages.

Heaton, et al., "Validation of Electron Density Profiles Derived From Oblique Ionograms Over the United Kingdom," Radio Science, 2001, vol. 36(5), pp. 149-1156.

Huang X., et al., "Mid-point Electron Density Profiles From Oblique Ionograms," Annals of Geo physics, Aug. 1996, vol. 39 (4), pp. 757-761.

International Preliminary Report issued in International Application No. PCT/US2016/019570, mailed on Sep. 8, 2017, 8 pages.

International Search Report and the Written Opinion of the International Searching Authority for International PCT Application No. PCT/US2016/19570, mailed May 11, 2016, 10 pages.

Jones, and Stephenson., "A Versatile Three-Dimensional Ray Tracing Computer Program for Radio Waves in the Ionosphere," NASA STI/Recon Technical Report, 1985, 199 pages.

Levis C., et al. "Radiowave Propagation; Physics and Applications," Wiley 2010; 4 pages.

McNamara L., "The Ionosphere: Communications, Surveillance, and Directing Finding," 1991, Orbit, a foundation series, Krieger Publishing Company; 230 pages.

McNamara L.F., "Quality Figures and Error Bars for Autoscaled Digisonde Vertical Incidence Ionograms," 2006, Radio Sei, 41, RS40I1; 16 pages.

Narayana R. N., "Ray Tracing from an Ionogram," Indian Journal of Radio & Space Physics, 1974, vol. 3, pp. 203-206.

Notification Concerning Transmittal of International Preliminary Report on Patentability (Chapter 1 of the Patent Cooperation Treaty.) for International (PCT) Application No. PCTZUS2016/019570, mailed Sep. 8, 2017, 8 pages.

Pezzopane M. and Scotto C., "The INGV Software for the Automatic Scaling of Fof2 and MUF(3000)f2 From Ionograms: a Performance Comparison With Artist 4.01 From Rome Data," 2005 Journal of Atmospheric and Solar-Terrestrial Physics, Aug. 2005, vol. 67(12): ISSN 1364-6826, pp. 1063-1073.

Reilly M, and Kolesar J.D., "A Method for Real Height Analysis of Oblique Ionograms," Radio Science, 1989, vol. 24(4), pp. 575-583.

Titheridge, J., "Ionogram Analysis with the Generalised Program POL-AN," Tech, rep., World DataCenter A for Solar-Terrestrial Physics, Coutder, CO, 1985, pp. 1-202.

Vesnin A.M., et al., "The Technique of Calculation of Electron Density Profile From Initial Distribution Using Vertical Sounding Ionograms," 2011, Institute of Solar-Terristrial Physics SB RAS, pp. 1-4.

Zabotin N A., et al., "NextYZ Three-dimensional Electron Density Inversion for Dynasonde Ionograms," Radio Science, Sep. 28, 2006, vol. 41(6), pp. 1-12.

Examination Report dated Apr. 1, 2021, directed to Australian Application No. 2019216706; 3 pages.

Examination Report dated Apr. 30, 2018, directed to Australian Application No. 2016222648; 4 pages.

Examination Report dated Jul. 4, 2019, directed to European Application No. 16 756 362.6; 7 pages.

Examination Report dated Jun. 16, 2020, directed to Australian Application No. 2019216706; 4 pages.

First Examination Report dated Apr. 24, 2018, directed to New Zealand Application No. 735707; 6 pages.

Further Examination Report dated Dec. 21, 2018, directed to New Zealand Application No. 735707; 4 pages.

Requisition by the Examiner dated Jun. 22, 2018, directed to Canadian Application No. 2,977,771; 6 pages.

* cited by examiner

ITERATIVE RAY-TRACING FOR AUTOSCALING OF OBLIQUE IONOGRAMS

CROSS REFERENCE TO RELATED APPLICATIONS

The present application is a divisional of U.S. patent application Ser. No. 15/553,169, filed Aug. 23, 2017, which is a National Stage of International Application No. PCT/US2016/019570 filed Feb. 25, 2016, which claims the benefits of and priority, under 35 U.S. C. § 119(e), to U.S. Provisional Application Ser. No. 62/120,854, filed Feb. 25, 2015, all of the above-mentioned documents are fully incorporated herein by reference in their entirety.

BACKGROUND

Field of the Invention

This invention relates generally to ionogram image processing, autoscaling and inversion and specifically to apparatus, systems, and/or methods for ionospheric monitoring, modeling, and estimation of the same.

Discussion of the Background

Ionospheric variability can have a significant impact on operational capabilities in many areas, including communications, navigation, and surveillance operations. As such, ionospheric monitoring is important for the support of requirements for global space weather impacts specification and forecasting.

A significant source of data for specification and forecasting of ionospheric effects are High Frequency (HF) radio sounders, e.g., frequency modulation continuous wave (FMCW) sounders or pulse Sounders, that are configured to provide high resolution observations of ionospheric phenomena such as travelling ionospheric disturbances.

SUMMARY OF THE INVENTION

Therefore, there is a need for ionospheric monitors, systems, and methods that address the above deficiencies and other problems in the related art.

One advantage of the present invention is to provide a system, e.g., a lightweight, low-power, and fully-autonomous ionospheric monitoring system that is able to provide fully processed and highly accurate ionosphere characterization in near real-time over a low data-rate satellite link.

The present disclosure can provide a number of advantages depending on the particular aspect, embodiment, and/or configuration. These and other advantages will be apparent from the disclosure. Additional features and advantages may be learned by the practice of the invention.

To achieve these and other advantages, as embodied and broadly described, as a method of iterative ray tracing including the steps of receiving a first input comprising data indicative of an OI ionogram. Next reducing at least one of noise and other spurious signals in the data, with computational equipment to programically produce a first output including the first output data and autoscaling the first output data, with computational equipment, to programically produce a second output including data indicative of a substantially separated O-trace and an X-trace. Finally, iteratively processing the second output, with computation equipment, to programically predict the electron density profile over the measurement region over a range typically from about 2 MHz to about 20 MHz.

To achieve these and other advantages, as embodied and broadly described, as a system for iterative ray tracing, including receiving a first input comprising data indicative of an OI ionogram at an image processing module. The system further includes reducing at least one of noise and other spurious signals in the data, with the image processing module to programically produce a first output comprising first output data and autoscaling the first output data received from the image processing module, with an autoscaling and extraction module to programically produce a second output comprising data indicative of a substantially separated O-trace and an X-trace. The system also includes iteratively processing the second output received from the autoscaling and extraction module, with an inversion module, to programically predict the electron density profile over the measurement region.

This Summary section is neither intended to be, nor should be, construed as being representative of the full extent and scope of the present disclosure. Additional benefits, features and embodiments of the present disclosure are set forth in the attached figures and in the description herein below, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

DETAILED DESCRIPTION

Figure 1A:
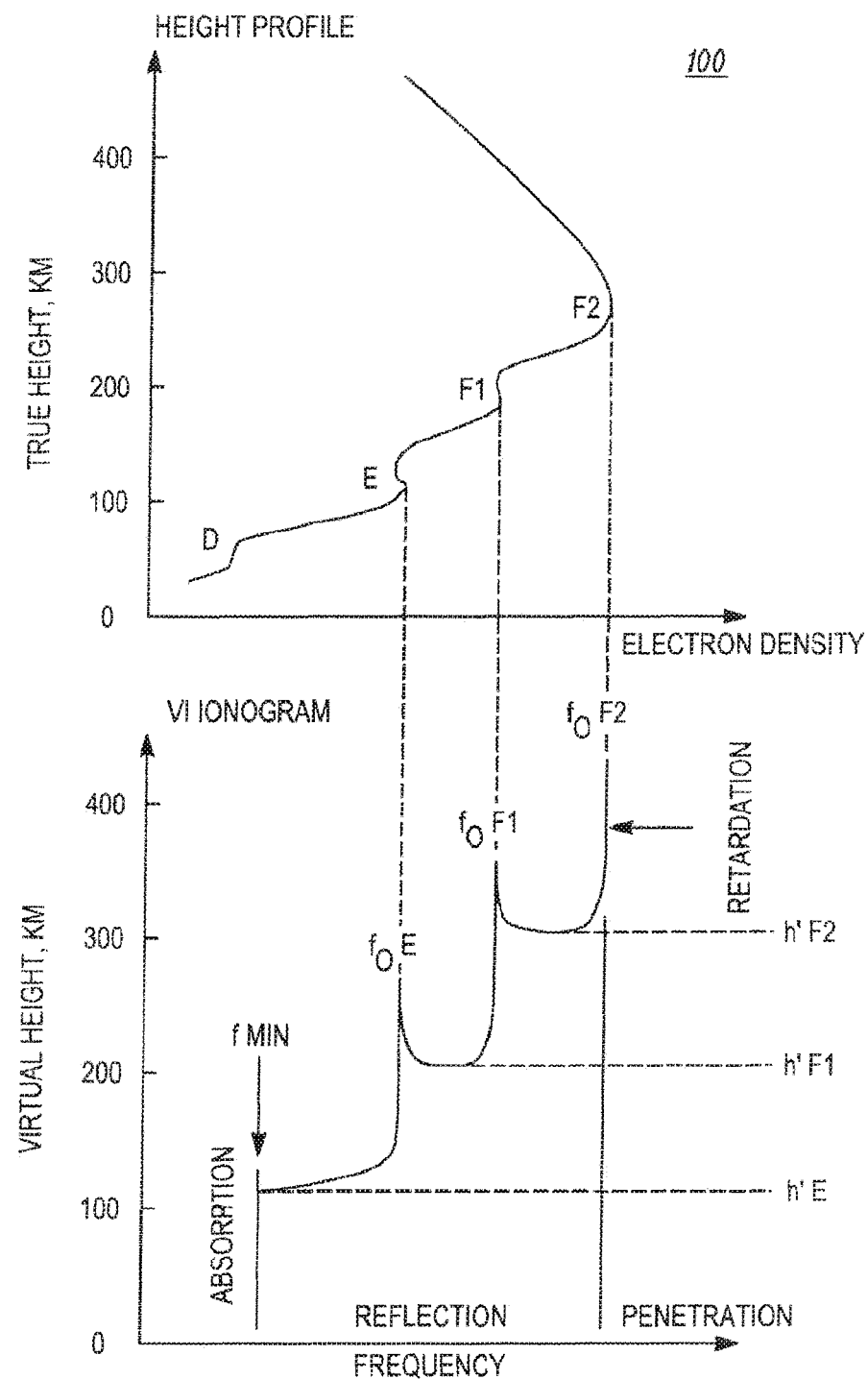
FIG. 1A illustrates a graphical representation of how the inversion is calculated according to related art.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module," as used herein, refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation or technique.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Embodiments herein presented are not exhaustive, and further embodiments may be now known or later derived by one skilled in the art.

Functional units described in this specification and figures may be labeled as modules, or outputs in order to more particularly emphasize their structural features. A module and/or output may be implemented as hardware, e.g., comprising circuits, gate arrays, off-the-shelf semiconductors such as logic chips, transistors, or other discrete components. They may be fabricated with Very-Large-Scale Integration (VLSI) techniques. A module and/or output may also be implemented in programmable hardware such as field programmable gate arrays, programmable array logic, programmable logic devices or the like. Modules may also be implemented in software for execution by various types of processors. In addition, the modules may be implemented as a combination of hardware and software in one embodiment.

An identified module of programmable or executable code may, for instance, include one or more physical or logical blocks of computer instructions that may, for instance, be organized as an object, procedure, or function. Components of a module need not necessarily be physically located together but may include disparate instructions stored in different locations which, when joined logically together, include the module and achieve the stated function for the module. The different locations may be performed on a network, device, server, and combinations of one or more of the same. A module and/or a program of executable code may be a single instruction, or many instructions, and may even be distributed over several different code segments, among different programs, and across several memory devices. Similarly, data or input for the execution of such modules may be identified and illustrated herein as being an encoding of the modules, or being within modules, and may be embodied in any suitable form and organized within any suitable type of data structure.

In one embodiment, the system, components and/or modules discussed herein may include one or more of the following: a server or other computing system including a processor for processing digital data, memory coupled to the processor for storing digital data, an input digitizer coupled to the processor for inputting digital data, an application program stored in one or more machine data memories and accessible by the processor for directing processing of digital data by the processor, a display device coupled to the processor and memory for displaying information derived from digital data processed by the processor, and a plurality of databases or data management systems.

In one embodiment, functional block components, screen shots, user interaction descriptions, optional selections, various processing steps, and the like are implemented with the system. It should be appreciated that such descriptions may be realized by any number of hardware and/or software components configured to perform the functions described. Accordingly, to implement such descriptions, various integrated circuit components, e.g., memory elements, processing elements, logic elements, look-up tables, input-output devices, displays and the like may be used, which may carry out a variety of functions under the control of one or more microprocessors or other control devices.

In one embodiment, software elements may be implemented with any programming, scripting language, and/or software development environment, e.g., Fortran, C, C++, C#, COBOL, Apache Tomcat, Spring Roo, Web Logic, Web Sphere, assembler, PERL, Visual Basic, SQL, SQL Stored Procedures, AJAX, extensible markup language (XML), Flex, Flash, Java, .Net and the like. Moreover, the various functionality in the embodiments may be implemented with any combination of data structures, objects, processes, routines or other programming elements.

In one embodiment, any number of conventional techniques for data transmission, signaling, data processing, network control, and the like as one skilled in the art will understand may be used. Further, detection or prevention of security issues using various techniques known in the art, e.g., encryption, may be also be used in embodiments of the invention. Additionally, many of the functional units and/or modules, e.g., shown in the figures, may be described as being "in communication" with other functional units and/or modules. Being "in communication" refers to any manner and/or way in which functional units and/or modules, such as, but not limited to, input/output devices, computers, laptop computers, PDAs, mobile devices, smart phones, modules, and other types of hardware and/or software may be in communication with each other. Some non-limiting examples include communicating, sending and/or receiving data via a network, a wireless network, software, instructions, circuitry, phone lines, Internet lines, fiber optic lines, satellite signals, electric signals, electrical and magnetic fields and/or pulses, and/or the like and combinations of the same.

By way of example, communication among the users, subscribers and/or server in accordance with embodiments of the invention may be accomplished through any suitable communication channels, such as, for example, a telephone network, an extranet, an intranet, the Internet, cloud based communication, point of interaction devices (point of sale device, personal digital assistant, cellular phone, kiosk, and the like), online communications, off-line communications, wireless communications, RF communications, cellular communications, Wi-Fi communications, transponder communications, local area network (LAN) communications, wide area network (WAN) communications, networked or linked devices and/or the like. Moreover, although embodiments of the invention may be implemented with TCP/IP communications protocols, other techniques of communication may also be implemented using IEEE protocols, IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein.

In embodiments of the invention, the system provides and/or receives a communication or notification via the communication system to or from an end user. The communication is typically sent over a network, e.g., a communication network. The network may utilize one or more of a plurality of wireless communication standards, protocols or wireless interfaces (including LTE, CDMA, WCDMA, TDMA, UMTS, GSM, GPRS, OFDMA, WiMAX, FLO TV, Mobile DTV, WLAN, and Bluetooth technologies), and may be provided across multiple wireless network service providers. The system may be used with any mobile communication device service (e.g., texting, voice calls, games, videos, Internet access, online books, etc.), SMS, MMS, email, mobile, land phone, tablet, smartphone, television, vibrotactile glove, voice carry over, video phone, pager, relay service, teletypewriter, and/or GPS and combinations of the same.

The ionosphere is a region of the Earth's upper atmosphere, ranging from about 100 km to 800 km in altitude. The ionosphere is distinguished by ionization of the atmospheric gases by solar and cosmic radiation. The ionosphere is useful for high frequency (HF) radio waves (e.g., shortwave radio at 1.6-30 MHz) communication because the HF radio waves may be refracted by the ionosphere, thereby extending the range of the communication by the HF radio waves bouncing between the ionosphere and the Earth's surface. For example, a transcontinental HF transmission may use several bounces between the ionosphere and the Earth's surface.

Irregularities in the ionosphere affect the transmission of radio waves. The effects include diffraction and scattering of the radio signals and others as known in the art. For HF radio waves refracted by the ionosphere, the practical effect may be that the refracted radio waves may be bounced to a different location from the intended receiver location. For trans-ionospheric radio signals (e.g., signals from GPS satellites, which may be at about 20,000 km orbits and have a frequency of over 1 GHz), the practical effect may be signal power fading, phase cycle slips, receiver loss of lock, and degradation in the overall quality of the received signal.

Ionospheric measurements are critical for characterization of ionospheric properties in support of communication operations and various systems. A HF sounder is a common instrument that is used for remote sensing of the ionosphere, and can provide information about the various height layers of electron density throughout the upper atmosphere.

HF sounders typically operate in one of two configurations, either at vertical incidence (VI) or at oblique incidence (OI). As the name implies, a VI sounder propagates radio waves in the vertical direction, thus obtaining information of the ionosphere directly overhead, and the transmit (Tx) and receive (Rx) stations are co-located. On the other hand, an OI sounder has the Tx and Rx stations separated by a ground distance, D, and provides ionospheric information around the midpoint between the two stations.

The general principle for OI and VI sounders are the same. Both record the group phase delay between the Tx and Rx stations as a function of frequency. From these measurements, the group range, or virtual height, is calculated, which is simply the group phase delay multiplied by the speed of light and divided by two. The virtual heights are then plotted against the swept frequencies to form an ionogram.

These measurements are then scaled and inverted to provide a calculation of the electron density as a function of true height. In this way, properties of the ionosphere can be calculated, including peak electron densities, peak altitudes, etc., which aid to characterize the ionosphere as a HF propagation channel.

The group range, h', can be defined by Equation 1 as:

$$h' = \int_0^h \mu' dh \qquad \text{Equation 1}$$

In Equation 1, h is the true reflection height (i.e., the altitude at which the ray physically reflects) [km], $\mu'$ is the group refractive index [unitless], which depends on the electron density in the ionosphere. Performing a change of variables for h for the critical frequency at which the wave reflects, f, by Equation 2:

$$h' = \int_0^f \mu' \frac{dh}{df_N} df_N \qquad \text{Equation 2}$$

In Equation 2, d is the differential operator, and f is critical frequency at which the wave reflects, ⌈MHz⌉. From Equations above the structure of the ionosphere can be estimated or predicted.

FIG. 1 illustrates a conceptual illustration of how the inversion is calculated according to related art.

Referring to FIG. 1A, the graph 100 generally depicts a relation between VI sounder measurements, e.g., a VI ionogram is illustrated in a lower portion of FIG. 1A and an associated electron density is illustrated in in upper portion of FIG. 1A. See Fabrizio, G. A. (2013), "High Frequency Over-The-Horizon Radar: Fundamental Principles, Signal Processing, and Practical Applications", McGraw-Hill Education, which is hereby incorporated by reference as if fully set forth herein. Below a certain frequency threshold, radio waves do not reflect and no information of the virtual height is recorded. As the frequency increases, the ionosphere is able to support propagation up until the critical frequency, at which the transmitted frequency exactly matches the plasma frequency of the ionosphere, and the wave is reflected back to the receiver. As the peak critical frequency approaches in frequency, the gradient of the frequency with respect to height approaches zero: $df_N/dh \rightarrow 0$, which results in an infinite gradient of the height with respect to frequency: $dh/df_N \rightarrow \infty$. As a result, the virtual height tends to infinity as well, producing the "cusp" in FIG. 1A. Similar features are shown for the F1 and F2 layers, and after the maximum layer critical frequency is reached, the wave is no longer reflected and instead transmitted through the ionosphere. In this way, the full VI ionogram is produced as known in the art.

OI ionosondes have the unique capability of probing the ionosphere at locations where VI sounders may be restricted, e.g., over oceans, inhospitable terrain and other areas. In addition, OI sounder systems have the potential for one transmitter to support several receiving stations. Any number of receiving stations can be used to a with a single transmitter, thereby increasing spatial coverage at a lower cost per coverage area as known in the art.

Figure 1B:
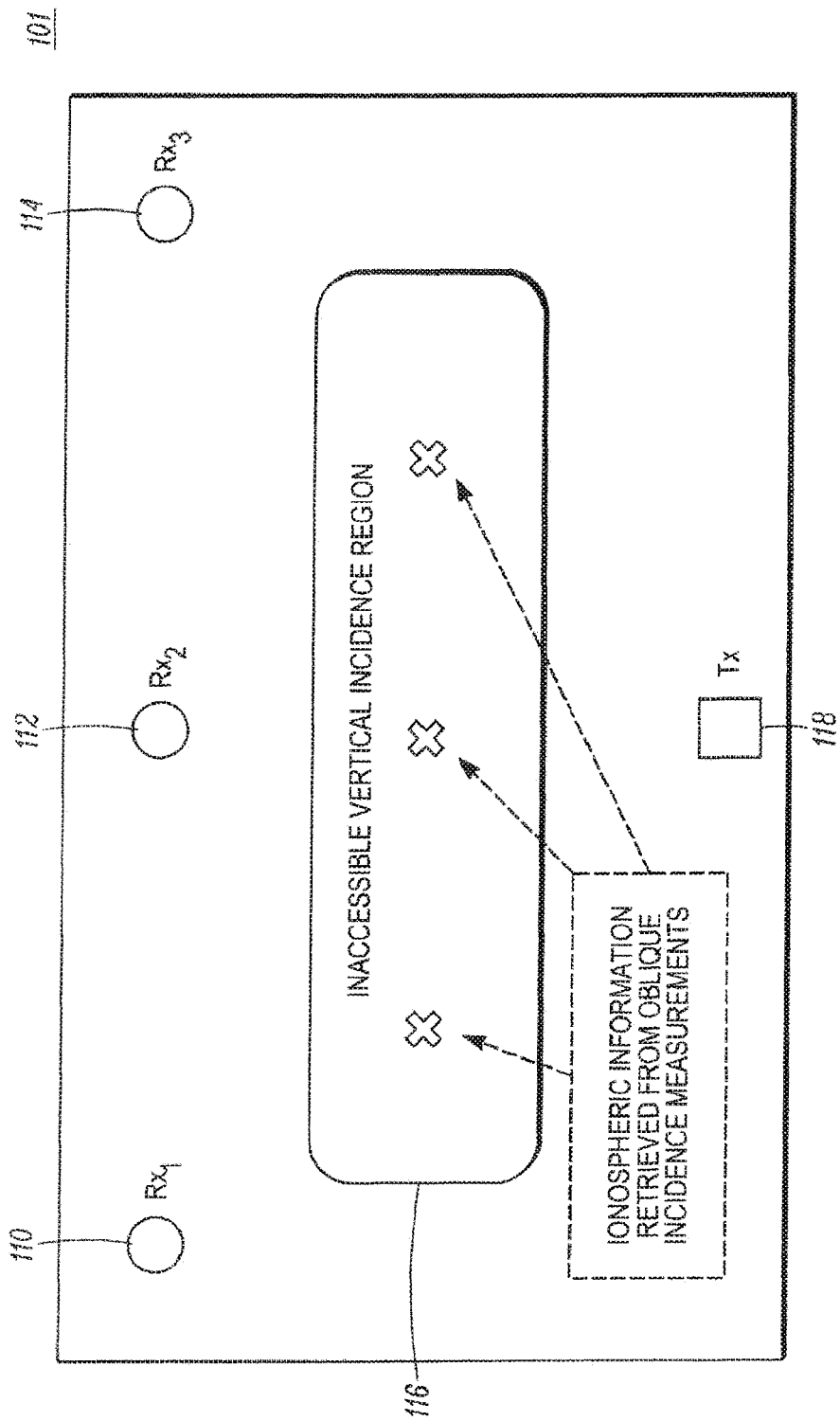
FIG. 1B illustrates the advantage of oblique incidence sounding over conventional vertical incidence sounding.

FIG. 1B illustrates an OI HF sounder system configuration and illustrates the advantage of OI sounding versus conventional VI sounding.

Referring to FIG. 1B, a sounder system is generally depicted with reference to number 101 and includes three receiver stations, Rx1, 110, Rx2, 112, and Rx3, 114 and also includes at a midpoint only transmitter station Tx, 118. The sounder system may include any conventional High Frequency (HF) radio sounders (HF sounders or Doppler sounders). In this embodiment, the system 101 is a sounder configured to depict the advantages of OI measurements. The shaded portion 116 represents a region that is inaccessible to VI sounders. In this embodiment, the OI Tx/Rx network probes the ionosphere at the midpoint of the Tx/Rx pair, resulting in information on the ionosphere being retrieved in the otherwise inaccessible region 116. Also, only one Tx station 118 is required to support three Rx stations.

This is depicted in FIG. 1B, in which three Rx stations are supported by one Tx station. In this example, the shaded region 116 represents an inaccessible region for a VI measurement. The OI sounder probes the ionosphere at the midpoint between the Tx and each Rx point, and in this way information about the ionosphere is retrieved from the inaccessible region. Furthermore, a total of four stations are used for three measurement points, whereas a total of six stations would be required for a conventional sounder network.

Embodiments of the invention are directed towards scaling and inverting ionogram for OI measurements. That is, converting the measured virtual heights as a function of frequency to electron densities as a function of true height, and subsequently the calculations to characterize the OI propagation channel.

These three receivers can enhance the ionospheric coverage area from a single transmitter in an otherwise inaccessible region that might previously have required several vertical incidence sounders. Embodiments herein, we will introduce concepts of existing techniques for ionogram inversion, first with respect to VI, then with OI ionograms.

The real height analysis of an ionogram, also known as an inversion process, is a technique to calculate the ionospheric profile as a function of true height. We briefly review the general procedure for VI ionogram inversion, and a comprehensive discussion of VI inversion is by Titheridge. Titheridge, J., (1985), "Ionogram analysis with the generalised program POLAN", Tech. rep., World Data Center A for Solar-Terrestrial Physics, Boulder, CO (USA), which hereby incorporated by reference as if fully set forth herein. The group height, h', [km] is defined by Equation 3, as follows:

$$h'_{i+1} = h_i + \int_{h_i}^{h_{i+1}} \mu' dh \qquad \text{Equation 3}$$

Here, $\mu'$ is the group refractive index [unitless]. This equation states that the group height at location i+1, which is the true height at location i plus the integration of the group refractive index with respect to height in the regions between $h_i$ and $h_{i+1}$. In order to proceed for VI ionogram inversion, an assumption must be made regarding the variation of electron density with respect to true height. For example, a linear variation is given as shown in Equation 4, as follows:

$$f_N = f_{N0} + bh \qquad \text{Equation 4}$$

In Equation 4, $f_N$ is the frequency of the plasma at the incremental layer [MHz] $f_{N0}$ is the frequency of the plasma at the base layer [MHz], b is the linear slop of the plasma [Mhz/km], and h is the incremental height [km]. For a VI ionogram profile, it is useful to do a change of variables such that we are integrating over frequencies, which is a quantity that we have from the ionogram shown in Equation 5 as follows:

$$\frac{df_N}{dh} = b \rightarrow dh = \frac{1}{b} df_N \quad \text{Equation 5}$$

$$h'_{i+1} = h_i + \frac{1}{b_i} \int_{f_i}^{f_{i+1}} \mu' df_N$$

$$= h_i + 1/b_i [h'(f_{i+1}) - h'(f_i)].$$

Given a starting true height, $h_i$, [km] (i.e., the bottom of the ionosphere), one can solve for $b_i$ [MHz/km], which is simply the slope of the electron density between the i and i+1 regions. Then, using the linear variation electron density model as shown in Equation 4, the plasma frequency for the true height can be calculated. This process is repeated for subsequent points in the ionogram to develop the electron density as a function of true height.

As known in the art, the variation between points can also be more complex, such as assuming parabolic or polynomial variations between the two points. For example a method commonly used for VI ionogram inversion, POLAN, uses a polynomial representation of the true height profile for the inversion as discussed by Titheridge. Id., which is hereby incorporated by reference as if fully set forth herein.

One technique for inverting OI ionograms involves calculating a VI ionogram from OI measurements, and then using VI inversion methods to calculate the electron density profile. In fact, this technique is used in the proposed work as a method to calculate the initial electron density for the iterative ray tracing algorithm. In order to provide context toward this method, we will calculate the relationship, or mapping, of VI measurements to OI measurements through a technique known as virtual ray tracing as taught by Fabrizio. Id., which is hereby incorporated by reference as if fully set forth herein.

This is also useful for Over the Horizon radars (OTHRs) in which the characteristics of the ionosphere propagation channel are determined from VI ionograms. In this way, a VI measurement can serve as a control point to OI measurements, as information retrieved from the VI measurement can be used for oblique links (e.g., the maximum usable frequency for the OI systems This is also useful for Over the Horizon radars (OTHRs) in which the characteristics of the ionosphere propagation channel are determined from VI ionograms. In this way, a VI measurement can serve as a control point to OI measurements, as information retrieved from the VI measurement can be used for oblique links (e.g., the maximum usable frequency for the OI systems).

The basis for virtual ray tracing are the secant law, Martyn's theorem, and Breit and Tuve's theorem. For simplicity, we assume a horizontally stratified ionosphere and neglect both collisions and Earth's magnetic field. The secant law relates the frequencies of an oblique and vertical ray that reflect at the same true heights as shown in Equation 6.

$$f_o = k f_v \sec \phi_o \quad \text{Equation 6}$$

Here, $f_o$ is the frequency at oblique incidence [MHz], and $f_v$ is the frequency at the vertical incidence [MHz], and $\phi_o$ [degrees] is the angle that the oblique wave strikes the bottomside of the ionosphere relative to normal. k [unitless] is the obliquity factor and ranges from 1.0 to 1.2, which takes into account the curvature of the ionosphere with respect to the curvature of the Earth as discussed in Davies and Fabrizio. See Davies, K, (1990), Ionospheric Radio, IEEE electromagnetic waves series, Peregrinus; Fabrizio at pg. 90, each of which is hereby incorporated by reference as if fully set forth herein. Equation 6 states that for a given true height, the frequency at which the wave reflects is larger if the ray is at oblique incidence rather than if the wave were at normal incidence.

Figure 1C:
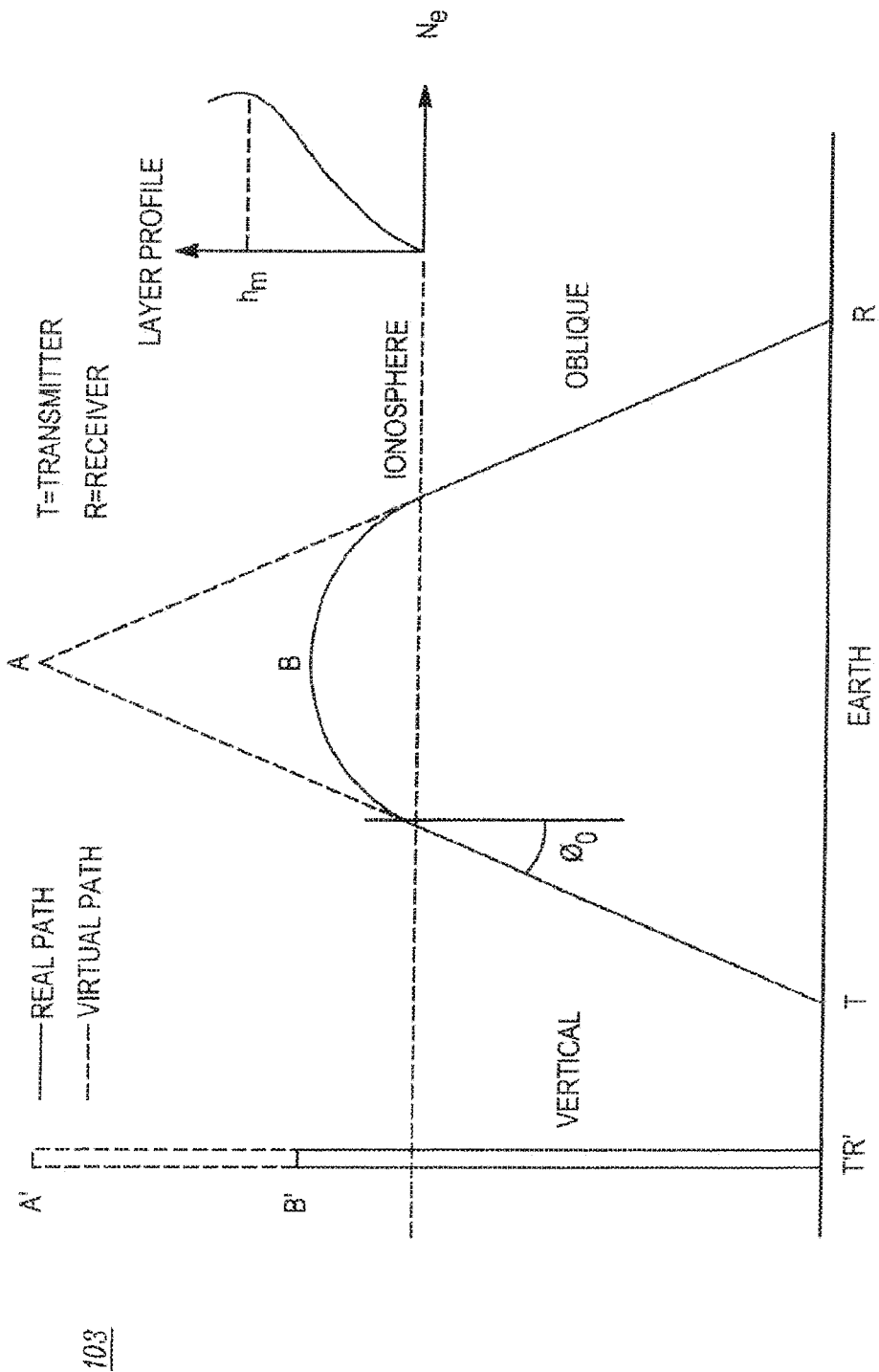
FIG. 1C illustrates a graphical representation of the true reflection height for the OI wave at frequency $f_o$ at B according to the related art.

Referring to FIG. 1C, an equivalent configuration for vertical and oblique incidence for waves with frequencies $f_v$ and $f_o$, respectively. The primed coordinates represent vertical incidence. The secant law (Equation 6) provides a relation between $f_v$ and $f_o$ such that the corresponding waves reflect from equivalent true heights. Referring to FIG. 1C, a true reflection height for the OI wave at frequency $f_o$ at oblique incidence [MHz] is at the altitudinal point B, [km] which is equivalent to the true reflection height for the VI wave at frequency $f_v$ at B' is shown. Notice that for the OI wave, the wave is refracted as it enters the ionosphere and "bends," eventually reaching the reflection point at B. The group path, or virtual path, that the OI wave travels can be modeled as P'=TA+AR as discussed by Breit and Tuve's theorem. [e.g., see Section 11.8 of Levis et al. (2010) Radiowave Propagation: Physics and Applications, Wiley], which is hereby incorporated by reference. Combining with Martyn's theorem, which states that the virtual reflection heights for both the OI and VI waves are equal (i.e., h'=A'=A), the group path, P', can be written as shown in Equation 7.

$$P' = \int_{ray\ path} \frac{1}{\mu} ds \quad \text{Equation 7}$$

$$\approx 2h' \sec \phi_o$$

Here, h'=A', the virtual path distance, P' traveled by the ray [km], μ is the refractive index [unitless], $\phi_o$ is the angle of oblique incidence [degrees], taking into account the curvature of Earth's surface, the group path is expressed as shown in Equation 8:

$$P' = 2\left\{h' + r_e\left[1 - \cos\left(\frac{D}{2 r_e}\right)\right]\right\} \sec \phi_o \quad \text{Equation 8}$$

Here, $r_e$, [km] is the radius of the Earth and D [km] is the ground path distance. Next, we take aim to find the skywave propagation between points T and R on the x-axis of the graph 103 in FIG. 1C. Given an electron density profile, there may be zero or several propagation solutions between points T and R (i.e., there may be zero or several sets of elevation and azimuth angle rays that arrive at the same receive point). To find these solutions, if they exist, we first use the identity, $\sec^2 \phi_o = 1 + \tan^2 \phi_o$, and find an expression for tan $\phi_o$ based on geometry of the Earth as shown in Equation 9.

$$\sec \phi_o = \sqrt{1 + \tan^2 \phi_o} \quad \text{Equation 9}$$

-continued $$\sec\phi_o = \sqrt{1 + \left(\frac{r_e \sin D/2r_e}{h' + r_e[1 - \cos D/2r_e]}\right)^2}.$$

Substituting Equation 9 into Equation 10 results in the following.

$$f_o = kf_v \sqrt{1 + \left(\frac{r_e \sin D/2r_e}{h' + r_e[1 - \cos D/2r_e]}\right)^2} \quad \text{Equation 10}$$

Solving for h' results in Equation 11:

$$h' = \frac{r_e \sin D/2r_e}{\sqrt{[f_o/(kf_v)]^2 - 1}} - r_e[1 - \cos D/2r_e]. \quad \text{Equation 11}$$

For a given $f_o$, frequency at an oblique angle [MHz] and ground distance, D, [km] Equation 11 provides the virtual height as a function of $f_v$, the frequency at vertical incidence [MHz]. The set of h' for several values of $f_o$ at a constant D are known as transmission curves.

Figure 1D:
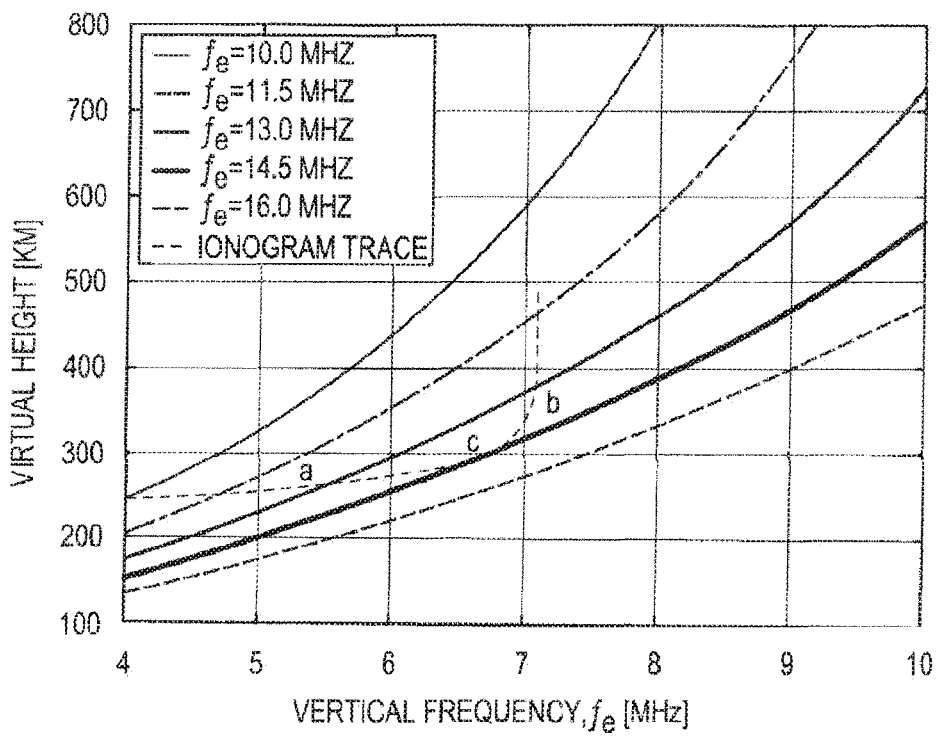
FIG. 1D illustrates a set of transmission curves for a certain distance with VI ionogram trace plotted according to related art.
Figure 1E:
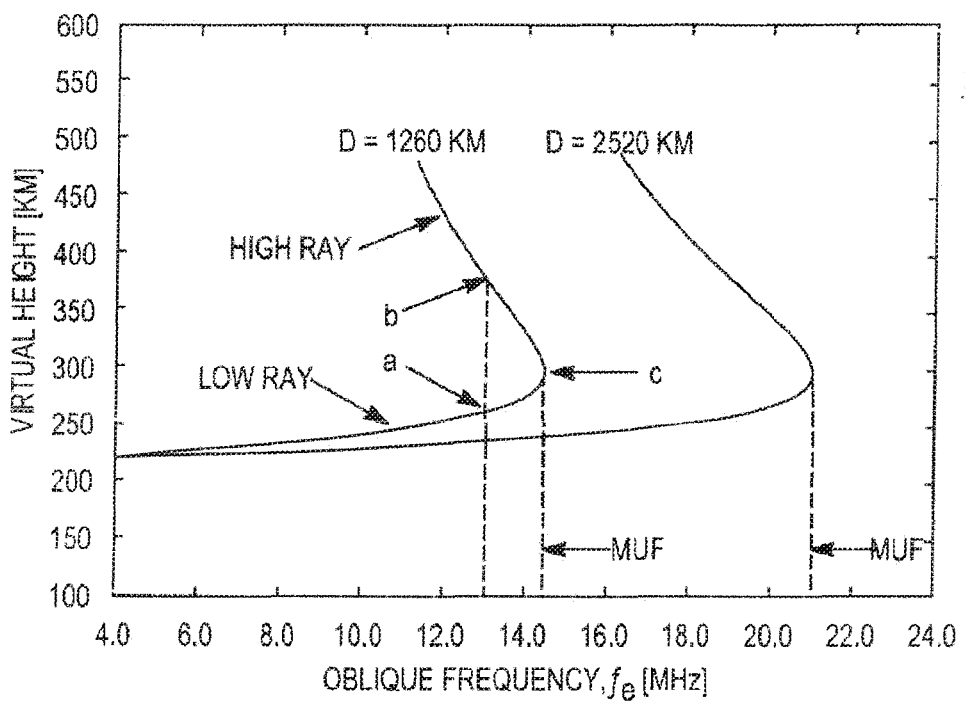
FIG. 1E illustrates a related art OI ionogram graphed from the intersection of transmission curves and VI trace data according to related art.

FIGS. 1D and 1E illustrates a set of transmission curves for a certain distance with VI ionogram trace plotted according to related art.

Referring to FIGS. 1D and 1E, illustrate various plots transmission curves in graphs 105 and 106 for several values of $f_o$ at a constant D=1260 km are shown. The VI ionogram trace is simply the virtual height as a function of $f_v$ [MHz]. In other words, for a VI trace, h' is constrained by $f_v$. Following a simplified analytical model for an ionogram discussed in Davies an Fabrizio, the ionogram trace is plotted in FIG. 1D. Id. In FIG. 1D, the points a, b, and c are representative intersection points between the transmission curves and the VI ionogram. These intersection points are solutions for the virtual heights of the equivalent triangular paths that obliquely reflect. That is, the intersection points provide an oblique frequency, $f_o$ (colored lines in FIG. 1D), and a vertical frequency, $f_v$ (black dashed line in FIG. 1D), that reflect from the same virtual height. For example, the intersection points a and b describe an oblique frequency of $f_o$=13 MHz that will reflect from two virtual heights (approximately 260 and 375 km, respectively). These are called low rays and high rays, respectively. On the other hand, the intersection point c calculates the maximum usable frequency (MUF) for an oblique ray to be $f_o$=14.5 MHz, and is often referred to as the nose of the OI ionogram.

As previously mentioned, the points a, b, and c map to points in the OI ionogram. If one were to continue drawing transmission curves in FIG. 1D, finding the intersection points (if any), and plotting the oblique frequency of the corresponding intersection at the particular virtual height, a complete OI ionogram would be developed.

FIG. 1E illustrates a related art CM ionogram graphed from the intersection of transmission curves and VI trace data.

Referring to FIG. 1E, when D equals 1260 km and also for D equals 2520 km. Focusing on the D equaling 1260 km curve, notice that points a and b correspond to the two intersection points in FIG. 1D at their respective virtual heights. The one intersection point c is at 14.5 MHz shows the "nose" of the OI ionogram.

In the mapping of VI to OI data the oblique incidence transmissions (e.g., for OTHR applications), and only requires data from a VI sounder. Furthermore, the derivation can be applied for any separation, D, between ground terminals, as long as the midpoint of the link is located where the VI data were measured.

Virtual Ray Tracing (VRT) can also be used to map OI data to VI data: given the virtual height at each point in an OI ionogram, the vertical frequency, $f_v$, can be calculated from the equations herein to construct the VI ionogram. This method has been used previously to invert OI ionograms, and the proposed technique will leverage VRT to produce an electron density profile for the initialization of the iterative algorithm.

Figure 2:
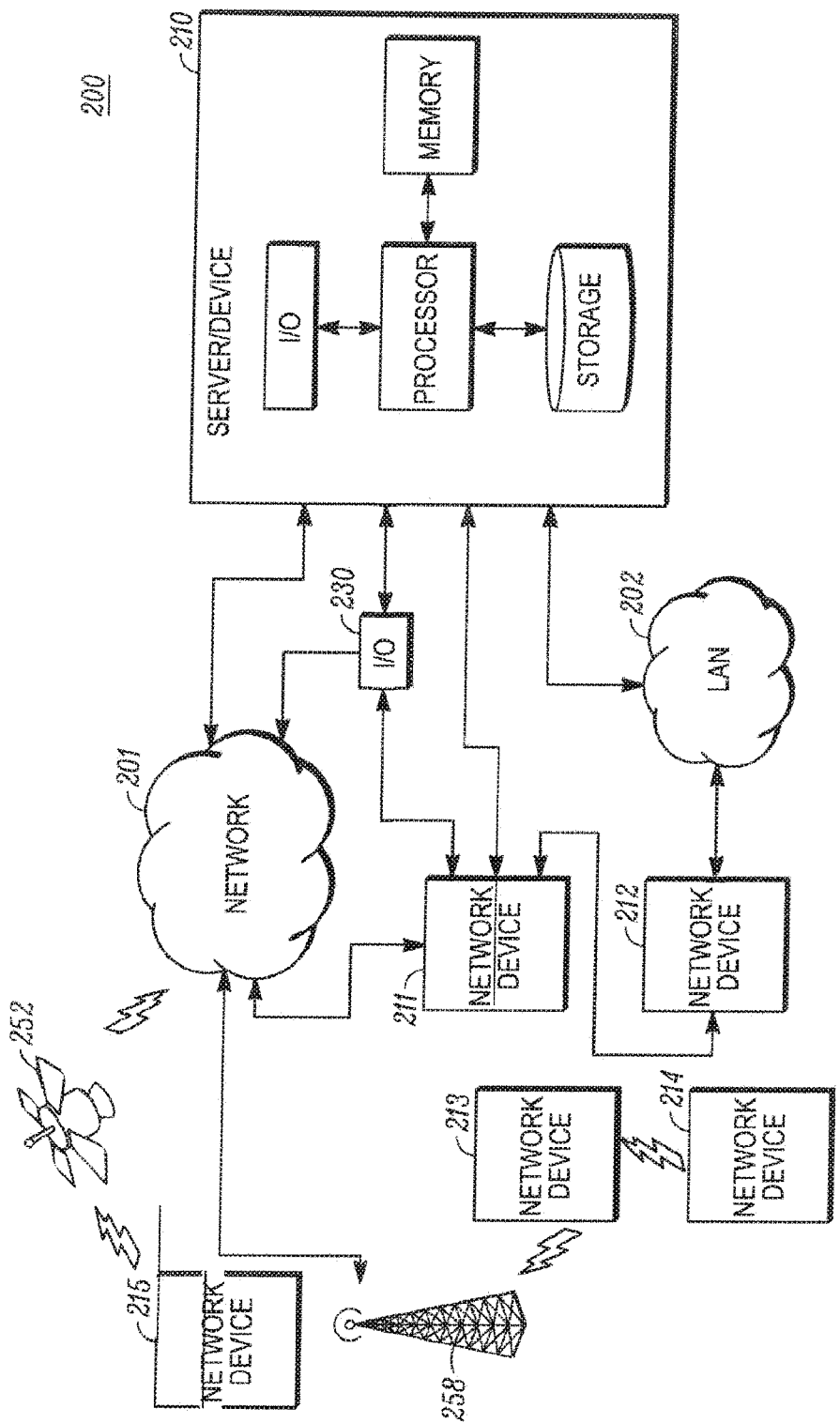
FIG. 2 illustrates an exemplary block diagram of a communication network for a tracking and processing system according to an embodiment of the invention.

FIG. 2 illustrates an exemplary block diagram of a communication network for a tracking and processing system according to an embodiment.

In one embodiment, the system 200 is utilized for iterative ray processing techniques and methods described herein. The system can be configured with large-scale, parallel computational capabilities that are leveraged for large image and signal processing demands and sounders. In embodiments herein, High Frequency (HF) radio sounders (HF sounders or Doppler sounders) are configured to provide high resolution observations of ionospheric phenomena such as travelling ionospheric disturbances either on a top side or bottom side. Some examples of HF sounders include a Frequency Modulated Continuous Wave (FMCW) Sounder which transmits a swept waveform across the frequency band, or a Pulse Modulated Sounder which transmits a series of pulses at each frequency stepping across the frequency band. In this embodiment, the sounders may be in communication with any aspect of the system 200. Referring to FIG. 2, communication network 200 includes one or more networks, including wide-area network 201, e.g., the Internet, company or organization Intranet, and/or sections of the Internet (e.g., virtual private networks, Clouds, and the Dark Web), and local-area network 202, e.g., interconnected computers localized at a geographical and/or organization location and ad-hoc networks connected using various wired means, e.g., Ethernet, coaxial, fiber optic, and other wired connections, and wireless means, e.g., Wi-Fi, Bluetooth, and other wireless connections. Communication network 200 includes a number of network devices 210-215 that are in communication with the other devices through the various networks 201 and 202 and through other means, e.g., direct connection through an input/output port of a network device 230, direct connection through a wired or wireless means, and indirect connection through an input-output box, e.g., a switch.

Network devices 210-215, which may also connect through the networks 201 and 202 using various routers, access points, and other means. For example, network device 213 wirelessly connects to a base station 258, which acts as an access point to the wide area network 201. The network devices may include a I/O, processor, memory and storage configured to perform processes and methods of modules described herein. The processing may be done in parallel, on a network device in the cloud, and combinations of the same. Base station 258 may be a cellular phone tower, a Wi-Fi router or access point, or other devices that allow a network device, e.g., wireless network device 213, to connect to a network, e.g., wide area network 201, through the base station 258. Base station 258 may be connected directly to network 201 through a wired or wireless connection or may be routed through additional intermediate service providers or exchanges. Wireless device 213 connecting through base station 258 may also act as a mobile access point in an ad-hoc or other wireless network, providing access for network device 215 through network device 213 and base station 258 to network 201.

In some scenarios, there may be multiple base stations, each connected to the network 201, within the range of network device 213. In addition, a network device, e.g., network device 213, may be travelling and moving in and out of the range of each of the multiple base stations. In such case, the base stations may perform handoff procedures with the network device and other base stations to ensure minimal interruption to the network device's connection to network 201 when the network device is moved out of the range of the handling base station. In performing the handoff procedure, the network device and/or the multiple base stations may continuously measure the signal strength of the network device with respect to each base station and handing off the network device to another base station with a high signal strength to the network device when the signal strength of the handling base station is below a certain threshold.

In another example, a network device, e.g., network device 215, may wirelessly connect with an orbital satellite 252, e.g., when the network device is outside of the range of terrestrial base stations. The orbital satellite 252 may be wirelessly connected to a terrestrial base station that provides access to network 201 as known in the art.

In other cases, orbital satellite 252 or other satellites may provide other functions such as global positioning and providing the network device with location information or estimations of location information of the network device directly without needing to pass information to the network 201. The location information or estimation of location information is known in the art. The network device may also use geolocation methods, e.g., measuring and analyzing signal strength, using the multiple base stations to determine location without needing to pass information to the network 201. In an embodiment, the global positioning functionality of the orbital satellite 252 may use a separate interface than the communication functionality of the orbital satellite 252 (e.g., the global position functionality uses a separate interface, hardware, software, or other components of the network device 213 than the communication functionality). In another embodiment, the orbital satellite with the global position functionality is a physically separate satellite from the orbital satellite with communication functionality.

In one scenario, network device, e.g., network device 212, may connect to wide area network 201 through the local area network 202 and another network device, e.g., network device 210. Here, the network device 210 may be a server, router, gateway, or other devices that provide access to wide area network 201 for devices connected with local area network 202.

Figure 3:
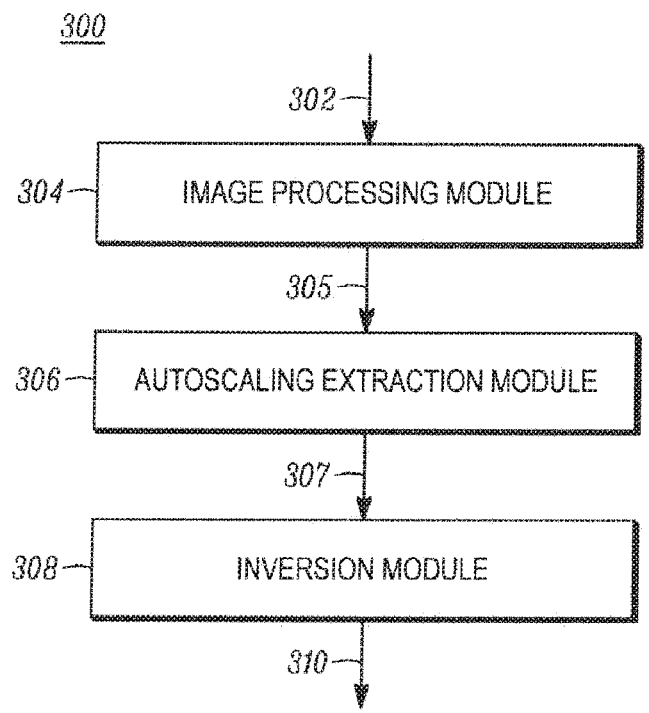
FIG. 3 illustrates an exemplary block diagram of a iterative ray tracing process according to an embodiment.

FIG. 3 illustrates an exemplary flow diagram of an iterative ray tracing process according to an embodiment.

In embodiments herein, Oblique Incidence (OI) sounders have the unique capability of probing the ionosphere where Vertical Incidence (VI) sounders are restricted, such as over oceans or inhospitable terrain. Oblique Incidence (OI) sounders may include a Frequency Modulated Continuous Wave (FMCW) Sounder which transmits a swept waveform across the frequency band, or alternatively a Pulse Modulated Sounder which transmits a series of pulses at each frequency stepping across the frequency band. The process of retrieving ionospheric parameters from a raw OI ionogram is important to accurately characterize the ionosphere and its properties.

Figure 5:
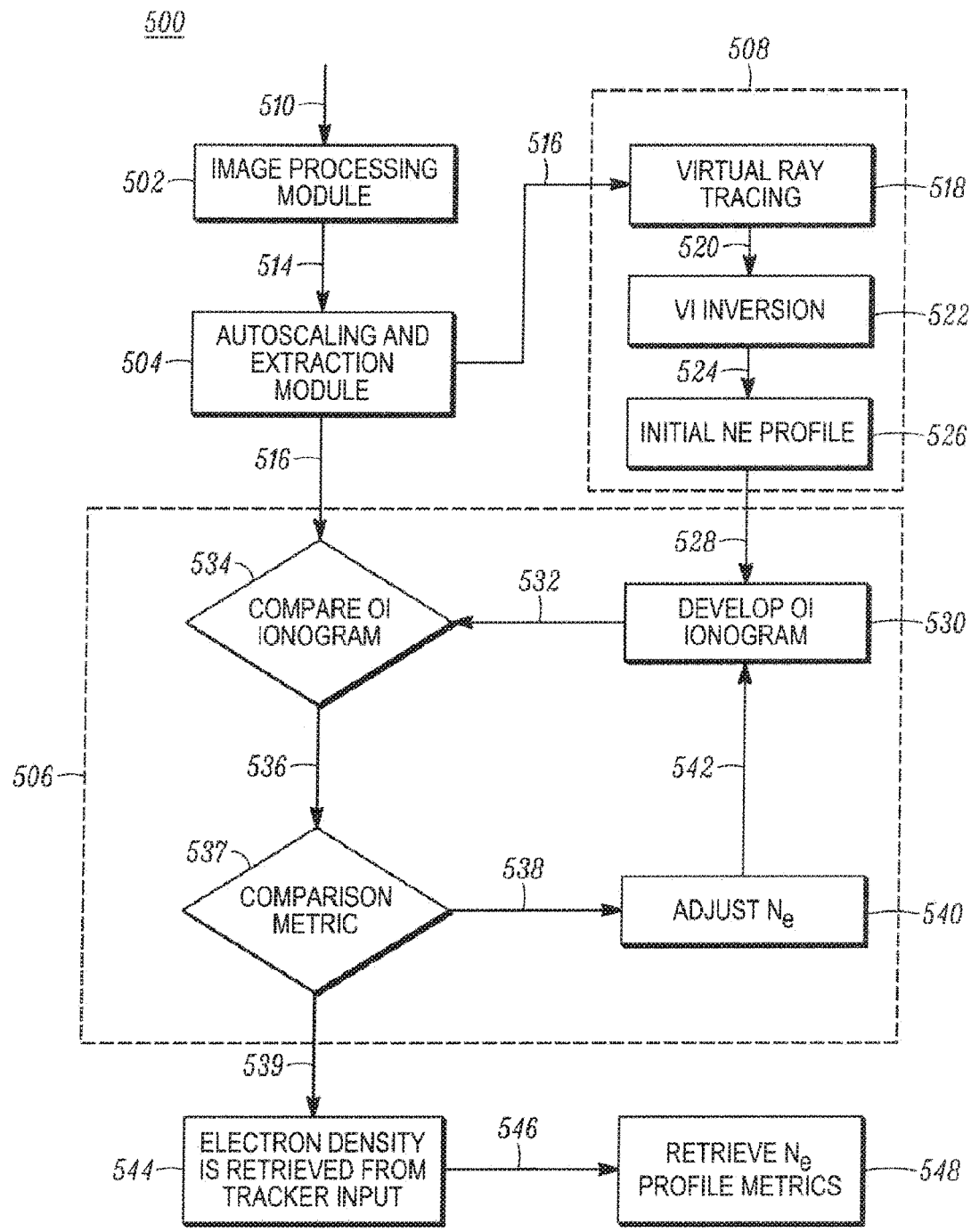
FIG. 5 illustrates an exemplary flow diagram of an iterative ray tracing process according to an embodiment of the invention.

Referring to FIG. 5, the processing is generally depicted with reference to number 500.

In embodiments herein, the processing, e.g., iterative ray tracing is described with reference can be done real-time, post processed, and/or a combination of the same. Moreover, the processing may be performed in the cloud, on a device, or a combination of cloud/device. System 200 can be utilized for the processing of the iterative ray tracing, e.g., the processing may be done on one or more networked devices 210, 211, 212, 213, and/or 214. In this embodiment, the iterative ray processing is generally described with reference to 300. The processing includes an image processing module 304, an autoscaling extraction module 306, and an inversion module 308. The processing can utilize a numerical ray tracing program with an iterative algorithm to solve for the electron density (and thus the link properties).

The processing 300 includes inputting data indicative of an ionogram, e.g., ( ) ionogram 302 into the image processing unit 504. The OI ionogram input 302 is data in the form of a mathematical matrix of pixels. The size of the matrix depends on the resolution. In a preferred embodiment, the matrix has a size of about 512 columns by about 512 rows. The vertical columns are derived from a 1024-point Fourier Transform of the vertical return from the ionosphere as known in the art. The rows represent typically 512 steps in frequency across the band of interest from minimum to maximum (but can be sampled in any frequency order). When the columns are joined together in a matrix, the peaks represent the layers in an oblique ionogram, and the height of the layer is calculated using half the time taken for the radio wave to travel from the sounder transmitter to the ionosphere and back to the receiver.

Figure 4A:
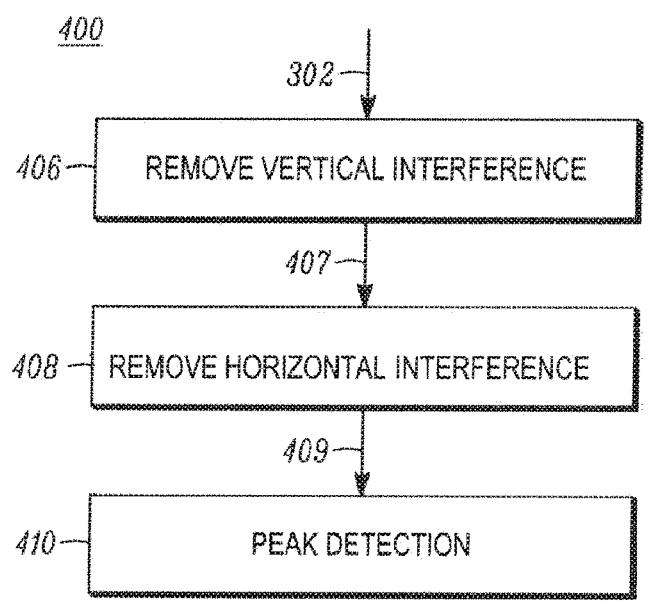
FIG. 4A illustrates an exemplary block diagram of image process module according to an embodiment.
Figure 4B:
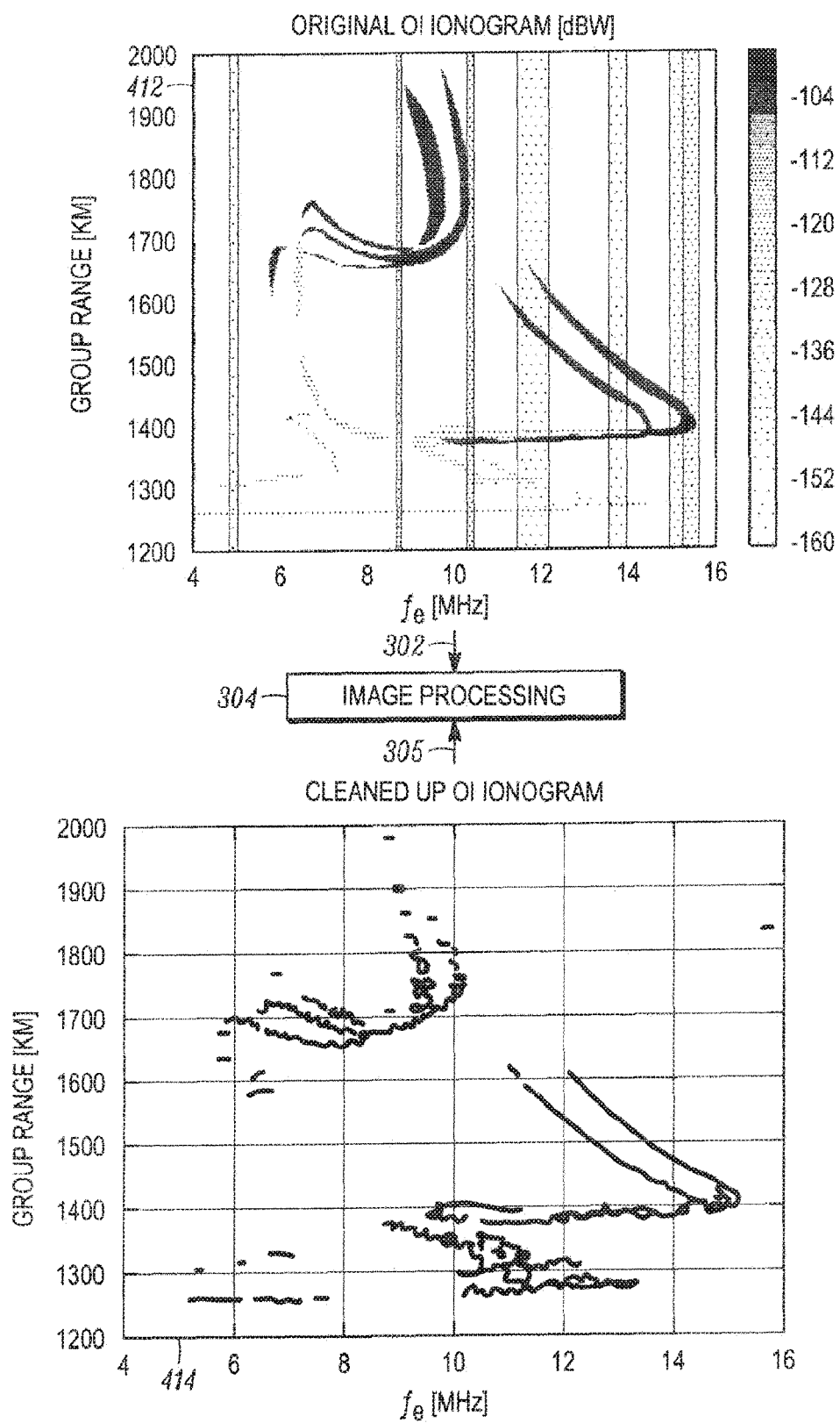
FIG. 4B illustrates an exemplary block diagram of image process module according to an embodiment.

The input 302 can be represented graphically as an original OI ionogram 412 as shown in FIG. 4B. Referring to FIG. 4B, the horizontal axis represents steps in $f_o$ in [MHz], while the vertical axis represents a Group Range converted from time taken to distance travelled [km]. The color of the column pixels represent the amplitude of the FFT bins within the column. The color scale shows the amplitude of the radar return, and therefore each peak amplitude represents each layer height. As shown in the input 302 includes group range information in each vertical column.

The image processing unit 304 is configured to process the input 305 and remove noise in the data of the input 302, e.g., the isolated peaks due to incoherent noise in plot 412 and other spurious signals that may be shown as vertical lines in plot 412 with a processing system as shown in FIG. 2. Median filtering and de-noising procedures as known in the art are conducted immediately afterwards. This image processing module 304 aids the next stage modules 306 and/or 308 to process accurately and without ambiguities in interpretation of the data, e.g., ionograms may be scaled and the true electron density profile can be recovered. The output 305 of the image processing module includes trace information representing the ionogram without errors from the original OI ionogram matrix.

FIG. 4A illustrates an exemplary flow diagram of image processing in the image process module according to an embodiment of the invention.

Referring now to FIG. 4A, in one embodiment, the input 302 is processed with the image processing module 304 to reduce background and other spurious noise features in the data of input 302. The image process module 304 processing is generally depicted with reference to 400. The process includes an input 302 sent to a remove vertical interference module or step 406 having an output 407 sent to a remove horizontal interference step 408 and an output 409 sent to a peak detection module or step (having and output not shown). The input 302 can include one or more of noise in the traces, interference bands (such as from power line harmonics and other operating HF systems), low SNR. The image process 400 is configured to identifying the OI trace from the ionogram in the presence of spurious harmonics, and other artifices in the measuring equipment, that are not relevant for identification of the traces. Referring to FIG. 4B, the graphical representation 412 is an example of a measured OI ionogram. See Fabrizio at FIG. 2.21. This plot 412 contains interference from spurious frequencies (vertical bands), as well as other sources of noise (speckled light blue colors throughout the image). The process 400 further includes removing vertical interference lines, step 406, removing horizontal interference lines, step 408, and peak detection of desired trace, step 410.

Step 406 is accomplished by subtracting the mean value of the pixel for the respective column of the matrix in input 302. Step 408 is accomplished by using a standard 5 point peak picking algorithm on the entire output of the FFT represented by the vertical column (using a 10 db threshold between 5 consecutive points to construct a valid peak). The peak detection in Step 410 is done as known in the art.

Embodiments of the invention are configured to include clean ionograms, with clearly identifiable traces, incomplete traces subject to interference, noise, etc., that. Optionally and/or alternatively, the process 400 can include routines and algorithms such as filtering and de-noising techniques that are generally unnecessary when using a windowed FFT.

The output 305 can be represented graphically as a cleaned up OI ionogram 414 shown in FIG. 4B. Referring to FIG. 4B, the x-axis represents $f_o$ in [MHz] and y-axis represents a Group Range in [km]. As shown, the relevant trace is extracted from 412 is identified as the ionogram trace selected from the sounder measurements.

The output 305 is processed in the autoscaling and feature extraction module 306. In one embodiment, after the data, e.g., processed images have been processed, e.g., cleaned up, by the image processing module 304 the major features of the CH trace are acquired. This data from the measurement can be summarized in a useful and meaningful format, e.g., the O- and X-traces can be separately identified, since these distinct responses are essential for a complete description of the ionosphere. O- and X-trace separation is challenging as these traces can be nearly or fully aligned in the OI ionogram.

Figure 4C:
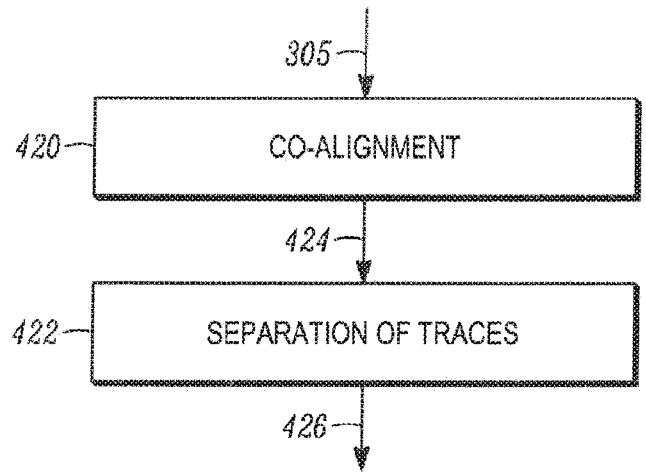
FIG. 4C illustrates an exemplary block diagram of autoscaling extraction module according to an embodiment.

FIG. 4C illustrates an exemplary flow diagram of autoscaling and extraction processing according to an embodiment of the invention.

Referring now to FIG. 4C, in one embodiment, the autoscaling extraction module 306 is configured to extract the relevant O- and X-trace information from the input 506 having data indicative of an OI ionogram, for all modes present. The output 307 of the autoscaling and feature extraction module includes data indicative of O- and X-trace information. In one embodiment, the output can be represented graphically, e.g., with an x-axis represents $f_o$ in [MHz], y-axis represents a Group Range in [km] base on power received at a receiver.

In step 420, the data from input 305 having information indicative of O- and X-traces are co-aligned to crossing point or intersection, e.g., the differences between O- and X-traces are zero, with techniques known in the art. Next, in step 422, data from input 424 having information indicative of O- and X-traces are processed by filtering, data reduction, and/or data fitting are utilized to separate the O- and X-mode traces. The output 426 is processed in the inversion module 308 to achieve an output 310. The inversion module 308 is configured to convert the OI ionogram into a VI ionogram, then solve for electron density profile.

Figure 4D:
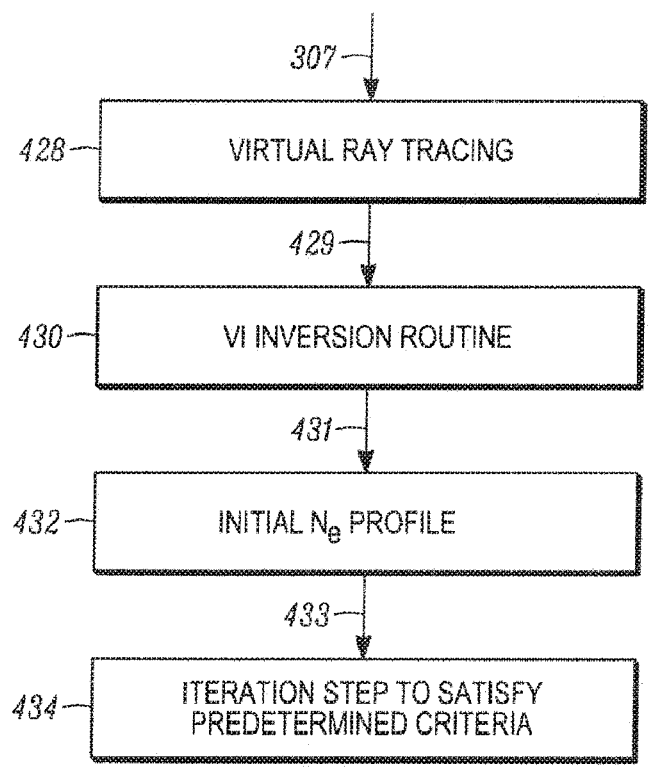
FIG. 4D illustrates an exemplary block diagram of an inversion module according to an embodiment.

FIG. 4D illustrates an exemplary flow diagram of autoscaling and extraction processing according to an embodiment of the invention. Referring now to FIG. 4D, in one embodiment, the inversion module performs steps to virtual ray tracing step or module 428 having an output 429 sent to an VI inversion step or module 430 having an output 431 sent to an Initial Ne Profile step or module 432 having an output 433 sent to an Iteration step or module 434 having an output not shown. In step 428, the oblique incidence profile is first converted to a vertical incidence profile through virtual ray tracing as known in the art and discussed herein. Next, an inversion routine, e.g., POLAN routine as discussed by Titheridge herein is used to convert the VI virtual height into a VI real height, and an initial electron density profile is obtained. Relevant parameters of the electron density profile are extracted, which will serve as initialization for the iterative raytracing technique.

From the cleaned and scaled trace, e.g., output 310, an electron density profile is retrieved as a function of height. Properties of the ionosphere, including propagation characteristics, can be derived from this information with the inversion module 308. Historically, the procedure for ionogram signal extraction and trace identification has been completed by a trained operator with experience in interpreting ionograms. However, there is a growing need to automatically scale (or to autoscale) ionograms for speed purposes, opening up new techniques for advanced systems that use iterative processing methods. It is no longer practical to rely on human interpretation of ionograms. As discussed herein, there are requirements for real-time, or near real-time, ionogram inversions to ingest data in various numerical models. These techniques demand that the ionograms be autoscaled in order to process large amounts of data in a timely, reliable, consistent, and accurate manner.

The challenges of Vertical Incidence (VI) autoscaling have been worked on for several decades, and techniques for VI autoscaling have been well established as discussed herein. They are readily available to the research community, e.g., such as via the POLAN routine as discussed in Titheridge. Id. One known autoscaling software is ARTIST, developed by Lowell Digisonde International as discussed in Galkin, et al., however, this code is proprietary and not publicly available. See Galkin, et al., (2008), "The ARTIST 5", in Radio Sounding and Plasma Physics, AIP Conf Proc. 974, 150-159, which is hereby incorporated by reference. Other routines such as Autoscala have been developed to perform automatic scaling of vertical soundings as discussed in Pezzopane and Scotto. See Pezzopane M., and Scotto, C., (2005), The INGV software for the automatic scaling of foF2 and MUF(3000)F2 from ionograms: A performance comparison with ARTIST 4.01 from Rome data, Journal of Atmospheric and Solar-Terrestrial Physics, Volume 67, Issue 12, August 2005, Pages 1063-1073, ISSN 1364-6826, which is hereby incorporated by reference as if fully set forth herein.

Figure 1F:
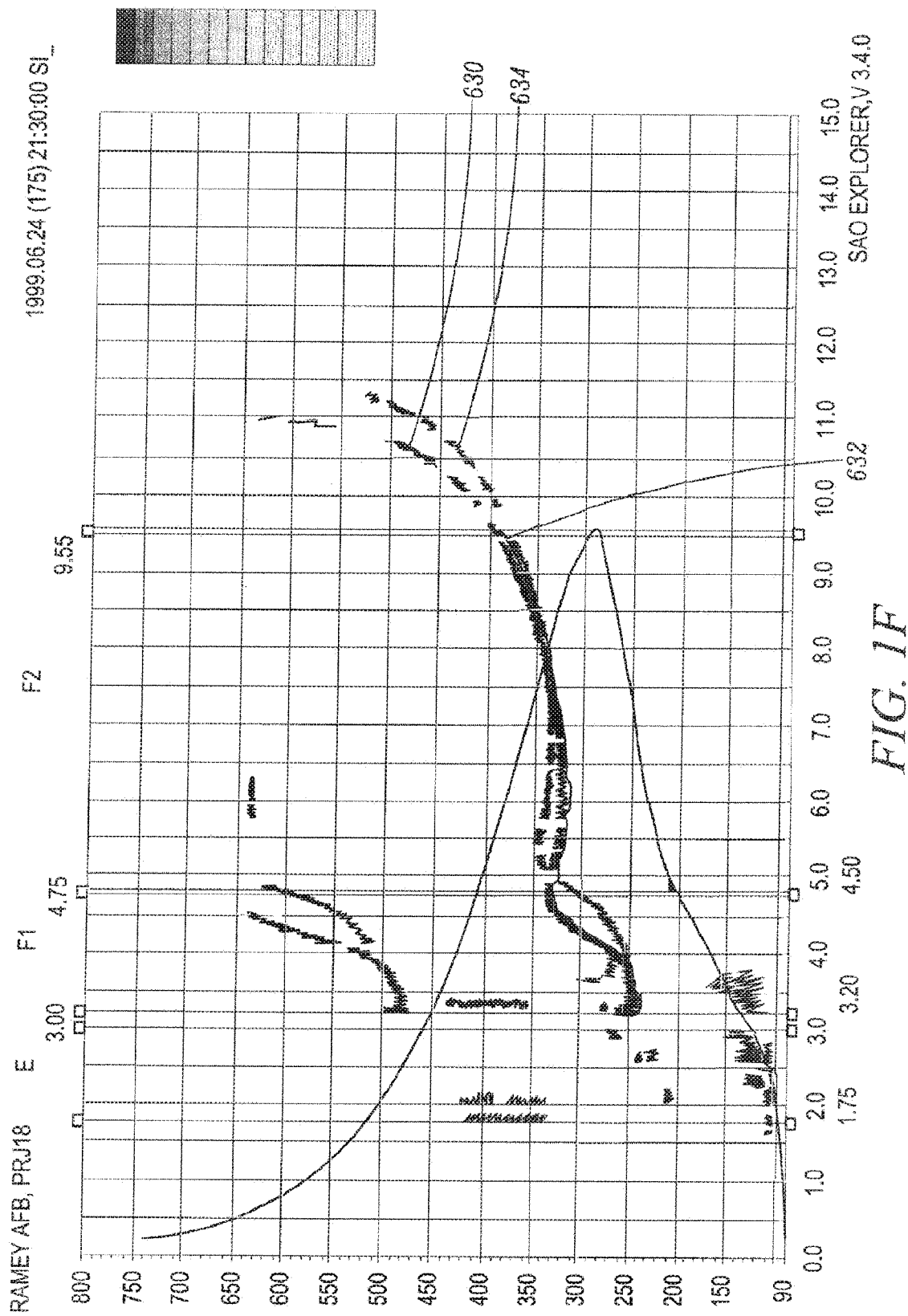
FIG. 1F illustrates an ionogram that was mis-scaled by ARTIST according to the related art.

Although it is considered to be the best available, anecdotally ARTIST procedure has problems processing at least thirty percent (30%) of Vertical Incidence ionograms. FIG. 1F illustrates an example of an ionogram that was misscaled as discussed by McNamara. McNamara, L. F., (2006), Quality figures and error bars for autoscaled Digisonde vertical incidence ionograms, Radio Sci., 41, RS4011, which is hereby incorporated by reference as if fully set forth herein. For example, the miscalling in FIG. 1F would lead to an incorrect ionogram and an incorrect inversion, which leads to an incorrect interpretation of the background electron density and propagation characteristics of the ionosphere. Referring to FIG. 1F, line 630 in FIG. IF shows the O-trace of the measurement. Careful inspection of this line 630 reveals line 632 superimposed on the O-trace, line 632 is a trace predicted by the ARTIST program. The trace stops at about 9.5 MHz, but the true O-trace, line 632, extends to about 11 MHz. Thereby, representing a problem with the ARTIST autoscaling procedure, as the calculated electron density shown in line 634 is inaccurate having a $F_oF2$ at approximately 11 MHz rather than 9.5 MHz predicted by the ARTIST autoscaling procedure.

In cases such as FIG. 1F, the ARTIST procedure is unable to identify the appropriate trace in the ionogram because portions of the data are missing, e.g., near 9.5 MHz in line 632 there is a brief cut in the data. It is believed that the error is not flagged and the software does not handle an error or cannot handle the error. Therefore, a user has no indication of data quality for the processed output, e.g., $F_oF2$ in FIG. 1F.

In one embodiment, the output 310 can include data indicative of qualitative and/or quantitative metrics, e.g., error bounds, to provide a qualitative control for the autoscaling process. It also provides a measure of how well the data fit the profile of electron density. Thereby, it is believed that with the image processing module 504 and signal extraction approach discussed herein, a more accurate electron density profile in the ionogram can be identified as compared to the ARTIST procedure. Optionally, and/or alternatively, a numerical ray tracing procedure can be performed through the incorrectly inverted ionogram, and the resulting synthetic ionogram trace was compared with the measured ionogram trace, it would be clear that ARTIST had an error. In fact, this is similar to how the brain works, so that a human operator can look at the scaled trace, or the resulting Ne profile, and immediately determine if there is a scaling error.

In one embodiment, for oblique ionograms, an iterative numerical ray tracing approach including a resulting Ne profile can be used to produce a series of synthetic oblique ionograms. Optionally, and/or alternatively, a comparison procedure can be used to compare to an original oblique ionograms, to yield an error estimate that could then be reduced by modifying the deduced Ne profile, and repeating the ray trace to produce another synthetic ionogram, until a specified metric is met. If the metric is not met within a number of iterations, then a failure flag is issued, and the iteration stops.

Moreover, there are several challenges for the analysis of OI ionograms as discussed in McNamara. See McNamara, L., (1991), "The Ionosphere: Communications, Surveillance, and Direction Finding", Orbit, a foundation series, Krieger Publishing Company, which is hereby incorporated by reference. These challenges for the analysis of OI ionograms include, 1. the absolute value of the group delay is not well known, 2. as the ray travels in the oblique incidence path, it may sample different ionospheric structures, 3. the elevation angles at the various frequencies for OI are not known, and 4. there may be several profiles that fit the data, and scaling can be sensitive to errors. Id. Given these difficulties, two primary methods of inverting OI ionograms have been discussed by Davies and McNamara, these include 1. Virtual Ray Tracing and 2. Step-by-Step Approach. See Davies and McNamara, (1991).

The Virtual Ray Tracing approach includes, first converting the CH ionogram into a VI ionogram, and then processes using standard VI inversion techniques. Id. In this method, Virtual Ray Tracing can be used to derive a VI ionogram from an OI ionogram. Id. Virtual Ray Tracing actually has nothing to do with ray tracing, but rather is a mathematical tool which describes a simple mapping of OI ionogram data to equivalent VI ionogram data. The technique does not actually use numerical ray tracing, as it is based purely on a mathematical description of geometry, and is often represented as tabulated curves known as transmission curves. Once the data is represented as a VI ionogram, processing routines such as POLAN as discussed by Titheridge can be used to invert the VI ionogram to obtain the specific electron density profile information. See Titheridge.

The Step-by-Step approach is similar to a VI ionogram inversion technique, the OI inversion can use a Step-by-Step approach to calculate the electron density profile. That is, the ionosphere is represented as parabolic or quasi-parabolic layers, so that iterative techniques can be used to solve for the profile. This type of technique solves the equations for the reflection height and the elevation launch angle simultaneously. An extensive algorithm and analysis is provided in Reilly and Kolesar, and has been verified experimentally. See Reilly, M H, and J. D. Kolesar, (1989), "A method for real height analysis of oblique ionograms", Radio Science, 24 (4), 575-583; Heaton, et al., (2001), Validation of electron density profiles derived from oblique ionograms over the United Kingdom, Radio Sci., 36(5), 1149-1156, each of which are hereby incorporated by reference.

Embodiments herein are directed towards a novel method of OI ionogram processing, e.g., scaling and inversion, that utilizes numerical ionospheric ray tracing. For example, the process described herein may be characterized as iterative ray tracing. In one embodiment, an automatic scaling and inversion of an oblique incidence (OI) ionogram can be used to predict or estimate properties of the ionosphere during the time at which the measurement was made. Optionally, and/or alternatively, the iterative ray tracing can utilize physics-based, numerical simulation approach to predict and/or estimate background electron density. O- and X-traces can be separated implicitly inside the processes described herein, and furthermore OI link characteristics estimate and/or predicted from the electron density solution directly.

We also note that the proposed Iterative Ray Tracing technique could be applied to quasi-vertical incidence (QVI) and VI sounders. This offers some potential to improve on the current ARTIST autoscaling processing and also offers applications to the network of ~30 Nexion Digisonde systems procured by the Air Force.

In one embodiment, the system 200 is utilized to efficiently simulate OI ionograms as part of a novel autoscaling strategy. Real-time autoscaling and analysis can be conducted in a range from about 15 minutes or less, e.g., about 1 minute or less. A typical requirement for real-time OI sounder update is between about 5 and about 15 minutes. As known in the art, this time is dependent, e.g., by the input required by real-time assimilative ionospheric models for operational use. For NVIS applications McNamara discloses that about 1 minute or less cadence is required to properly measure traveling ionospheric disturbances (TIDs). See McNamara (1991), which is hereby incorporated by reference as fully set forth herein. In one embodiment, the system 200 can be configured to process scaled and inverted oblique ionograms within about 1-min or less.

In one embodiment, the iterative ray tracing processing herein may utilize numerical simulations of OI ionograms to iteratively solve for the background electron density. Unlike the mathematical description of Virtual Ray Tracing (which does not involve numerical ray tracing as discussed herein), the iterative ray tracing processing described herein does use numerical ray tracing, and does not rely on assumptions regarding geometry or simplifying properties of the ionosphere (such as a collisionless ionosphere and the exclusion of the Earth's magnetic field), as the numerical ray tracing program already takes into account the curvature of the Earth, collisions in the ionosphere, and Earth's magnetic field. Thus the results from the proposed method become more realistic and accurate.

Furthermore, the iterative ray tracing processing is robust against noisy and/or missing data, as the ray tracing routines provide a complete OI ionogram trace, thus filling in the missing data gaps from the original OI ionogram, in addition to providing a description of the underlying electron density.

Moreover, the iterative ray tracing process, e.g., process 500, can be used with real-time ionospheric models to develop a characterization of the ionosphere. In addition, FIG. 5, an iterative ray process is disclosed with reference to number 500. The technique can be used of iterative ionospheric ray tracing for OI ionogram inversion.

A variant of the TRACKER ray-tracing program can be used in aspects of the embodiments herein as disclosed in Argo. See Argo, et al., (1994), "TRACKER: A three-dimensional ray tracing program for ionospheric radio propagation", NASA STI/Recon Technical Report N, 95, 24, 015, which is hereby incorporated by reference. The TRACKER is a three-dimensional Hamiltonian ray tracing code that is derived from the Jones Code as discussed in Jones and Stephenson, originally written in the 1960s and 1970s in the FORTRAN programming language. See Jones, R. M, and J J. Stephenson, (1975), "A versatile three-dimensional ray tracing computer program for radio waves in the ionosphere", NASA STI/Recon Technical Report N, 76, 25,476, which is hereby incorporated by reference. The program predicts the three-dimensional radio paths through a model ionosphere by numerically integrating Hamilton's equations, and incorporates geometrical optics in the code. Id. Embodiments of the invention are configured to handle the computational challenges of a "spitze," in which the ray tracing equations break down for a propagation near vertical incidence at low latitudes.

Optionally and/or alternatively, processes with the TRACKER are configured to calculate one or more or all radio paths from a given transmitter to a given receiver location (e.g., low and high rays). In addition, the user may be able to fully specify the electron density model that is input to TRACKER, providing additional flexibility.

FIG. 5 illustrates an exemplary flow diagram of an iterative ray tracing process according to an embodiment of the invention.

Referring to FIG. 5, an iterative ray tracing process is generally described with reference to number 500. The process 500 generally includes processing with system 200 via an image processing module 502, an autoscaling and extraction module 504, an inversion module 506, and an initialization for inversion module 508.

The image processing module 502 includes a raw OI ionograms input 510 and output 514. The image processing module 502 is configured to remove noise and spurious signals as discussed herein, e.g., with reference to FIGS. 4A to 4B. The input 510 can be obtained commercially or retrieved with a sounder system as described herein.

The data from output 514 from the image processing module 502 is scaled with the autoscaling and extraction module 504, which is configured to generate an output 516.

The autoscaling extraction module is discussed with reference to FIG. 4C. The output 516 is output to an initialization for inversion module 508 and an inversion module 506. The output 516 may be output substantially simultaneously to those modules. The output of the autoscaling and extraction module 504 can be considered a matrix, Z with entries $Z_{ij}$, where i is the row and j is the column. In a preferred embodiment, the size of matrix Z is 512×512 pixels. The ith row represents group range information about the reflection of the radio signal at the jth frequency bin. The values of Z are binary values, with each entry being either '0' or '1'. The value '0' represents no reflection, while '1' represents reflection at the ith range bin and jth frequency bin. A graphical representative example is shown in plot 412, where the '1' values are colored in green dots, while the '0' values are not shown (white background).

The input 516 to the initialization for inversion module 508 is the matrix Z, which contains the group range and frequency information from the OI ionogram. The initialization for inversion module 508 is configured to provide an electron density profile as initialization. Here, the electron density profile is defined as the electron density (Ne, [cm$^{-3}$]) as a function of true height [km]. In this embodiment, the initialization for inversion module 508 includes a virtual ray tracing step 518, VI inversion step 522, and initial Ne profile step 526. The output of this module 528 includes data indicative of parameters which describe the height of the maximum density ($h_m$), and the value of maximum electron density ($N_m$): for the E, $F_1$, and $F_2$ regions: $h_mE$, $N_mE$, $h_mF_1$, $N_mF_1$, $h_mF_2$, and finally $N_mF_2$.

The virtual ray tracing step 518 is conducted as discussed herein and known in the art. The input 516 is the matrix Z mapping frequency (represented as column j) to group range (represented as row i) for a given reflection, with respect to an oblique incidence (OI) sounder. The output 520 of step 518 is a matrix of the same shape (e.g., 512×512) of the input 516, but maps frequency (represented as column j) to group range (represented as row i) with respect to a vertical incidence (VI) sounder, $Z^{VI}$(720). The values of $Z^{VI}$ are binary, either '0' or '1'. A value of $Z_{ij}^{VI}=1$ represents a reflection for the jth range bin at the ith frequency bin, while a value of $Z_{ij}^{VI}=0$ represents no reflection for the jth range bin at the ith frequency bin.

The input 524 to VI inversion step 722 is a matrix, $Z^{VI}$, e.g., 512×512 pixels, which maps frequency (represented as column j) to group range (represented as row i) with respect to a vertical incidence (VT) sounder. In the VI inversion module, a VI inversion routines such as POLAN can be used to convert the matrix $Z^{VI}$ into data indicative of the electron density as a function of true height. The output 524 of this module is a list of electron densities ($n_e^{VI}$, typically of length 512 pixels) corresponding to a list of true altitudes (alt$^{VI}$, typically a length of 512).

Next, in step 526 the relevant ionospheric parameters are extracted from the VI inversion routine (e.g., POLAN) as known in the art to produce the Initial Ne Profile. In a preferred embodiment, parameterization for Chapman layers can be used, which are prescribed by a given altitude of the maximum electron density ($h_m$ [km]) and the maximum electron density ($N_m$[cm$^{-3}$]), for each of the E, $F_1$, and $F_2$ regions. This restricts the number of parameters to six: $h_mE$ [km], $N_mE$ [cm$^{-3}$], $h_mF_1$ [km], $N_mF_1$ [cm$^{-3}$], $h_mF_2$ [km], and finally $N_mF_2$ [cm$^{-3}$]. The output 528 provides data indicative of nine parameters ($h_mE$, $N_mE$, $h_mF_1$, $N_mF_1$, $h_mF_2$, and $N_mF_2$) in 728, which parameterize the electron density Chapman profiles.

The inversion module 706 is configured to perform an iteration procedure to calculate the true electron density profile (electron density [cm$^{-3}$] as a function of true height [km]) given the raw HF Doppler sounder measurements received 510. The input 516 to this module 506 includes a matrix Z, the matrix representing the trace points from the input OI ionogram, and also input 728, including data indicative of parameters Initial Ne Profile ($h_mE$, $N_mE$, $h_mF_1$, $N_mF_1$, $h_mF_2$, and $N_mF_2$).

In step 530, an OI ionogram is produced from the TRACKER raytracing program. The inputs to this module includes input 528 having data indicative of parameters for the electron density profile: $h_mE$, $N_mE$, $h_mF_1$, $N_mF_1$, $h_mF_2$, and $N_mF_2$. These values parameterize a Chapman electron density profile (electron density as a function of true height), which are extended in latitude and longitude by approximately 5°×5°. With this constructed ionosphere, the TRACKER raytracing program produces an OI ionogram, which can be represented as a matrix, $Z^{k,OI}$ Here, an entry to the matrix $Z^{k,OI}$ is $Z_{ij}^{k,OI}$, where the ith row represents group range information about the reflection of the radio signal in the jth frequency bin. The k represents the iteration number used in the procedure (initialized as '0'), and "OI" represents that this matrix was generated by oblique incidence. The value of $Z_{ij}^{k,OI}$ represents the modeled power received by the HF Sounder system, in units of decibels above a watt (dBW). One A typical visualization of $Z^{k,OI}$ can be represented graphically, e.g., by plotting the virtual height [km] as a function of oblique frequency [MHz] with a colorbar that represents the signal power received [dBW]. Both the O- and X-mode polarization traces are shown. $Z^{k,OI}$ is the output 532 of this step 530, which is input into the Compare OI ionogram step 534.

In step or module 534 there are two inputs: the input 516 having a trace extracted from the measured OI ionogram, Z, and the input 532 having a modeled kth iteration of the OI ionogram from the TRACKER ray tracing program, $Z^{k,OI}$. In step 534 the inputs including data indicative of the of two ionograms are compared. That is, Z is compared with $Z^{k,OI}$. The comparison is considered as the difference in altitude for a given frequency bin, j. This is defined as $\Delta Z$, with $\Delta Z$ being a list of J entries, typically J=512 in length. We define $\Delta Z_j = |Z_{i_1,j} - Z_{i_2,j}^{k,OI}|$, where the $i_1$th and $i_2$th index is selected to be the value that maximizes each jth column of $Z_{i_1,j}$ and $Z_{i_2,j}^{k,OI}$. The output 536 of this module 534 is the difference list, $\Delta Z$, indicating the absolute difference of altitudes from the measured and modeled ray tracing ranges at the jth frequency, which is typically J=512 in length. The output 536 of this module is $\Delta Z$ and sent to a comparison metric module 537.

In step 537, a the difference of altitudes ($\Delta Z$) from the measured and modeled ray tracing is conducted in order to satisfy a predetermined criteria. An examples of this predetermined criteria include a mean squared distances are less than a distance, $d_{criteria, MS}$ [km], or the median difference of altitudes is less than a distance, $d_{criteria, M}$ [km]. If the criteria is met, then the process proceeds to and an output 539. If the criteria is not met, the algorithm proceeds to output 538. The predetermined criteria, which is a minimum distance criteria based on the parameter searched, e.g., as shown FIG. 7.

In step 540, In this module, one or more electron density profile parameters ($h_mE$, $N_mE$, $h_mF_1$, $N_mF_1$, $h_mF_2$, and $N_mF_2$) are adjusted by an incremental amount according to one or more of the following equations:

$$h_mE \leftarrow h_mE + \Delta h_mE \qquad \text{Equation 12}$$

$$N_mE \leftarrow N_mE + \Delta N_mE \qquad \text{Equation 13}$$

$$h_mF_1 \leftarrow h_mF_1 + \Delta h_mF_1 \qquad \text{Equation 14}$$

$$N_mF_1 \leftarrow N_mF_1 + \Delta N_mF_1 \qquad \text{Equation 15}$$

$$h_mF_2 \leftarrow h_mF_2 + \Delta h_mF_2 \qquad \text{Equation 16}$$

$$N_mF_2 \leftarrow N_mF_2 + \Delta N_mF_2 \qquad \text{Equation 17}$$

The incremental values are determined to minimize the difference of altitudes from the measured and modeled ray tracing, $\Delta Z$ (536). The updated electron density profile parameters ($h_mE$, $N_mE$, $h_mF1$, $N_mF_1$, $h_mF_2$, and $N_mF_2$) are input into step 530 via input 542. Finally, the iteration index is incremented by $k \leftarrow k+1$.

If the comparison metric, in step 537 is declared satisfactory then an output 539 then the iterative ray tracing procedure has found the true electron density profile derived from the raw OI HF Doppler measurements input 510. Both the electron density and the associated electron density profile parameters ($h_mE$, $N_mE$, $h_mF_1$, $N_mF_1$, $h_mF_2$, and $N_mF_2$) from step 544 is output 546 to the retrieve Next in step 548, the iterative ray tracing algorithm provides the electron density profile parameters ($h_mE$, $N_mE$, $h_mF_1$, $N_mF_1$, $h_mF_2$, and $N_mF_2$) and the corresponding electron density profile (electron density [cm$^{-3}$] as a function of true height [km]) to the user. The parameters ($h_mE$, $N_mE$, $h_mF_1$, $N_mF_1$, $h_mF_2$, and $N_mF_2$) and electron density profile are considered metrics for the underlying ionosphere.

EXAMPLE

Without intending to limit the scope of the invention, the following examples illustrate how various embodiments of the invention may be made and/or used.

Example 1

This Example 1 illustrates an ionogram image processing on data collected from a top side sounder and processed.

Example 1 follows the procedure 500 in FIG. 5 through a detailed process. In this embodiment, data from a VI sounder probing the topside ionosphere was used for input 510. A VI sounder is a generalization of an OI sounder. A topside ionosphere can also be considered as a generalization of the bottom-side sounding technique. The processes described herein can be used with any type of sounder data, e.g., bottom side or top side.

Figure 6A:
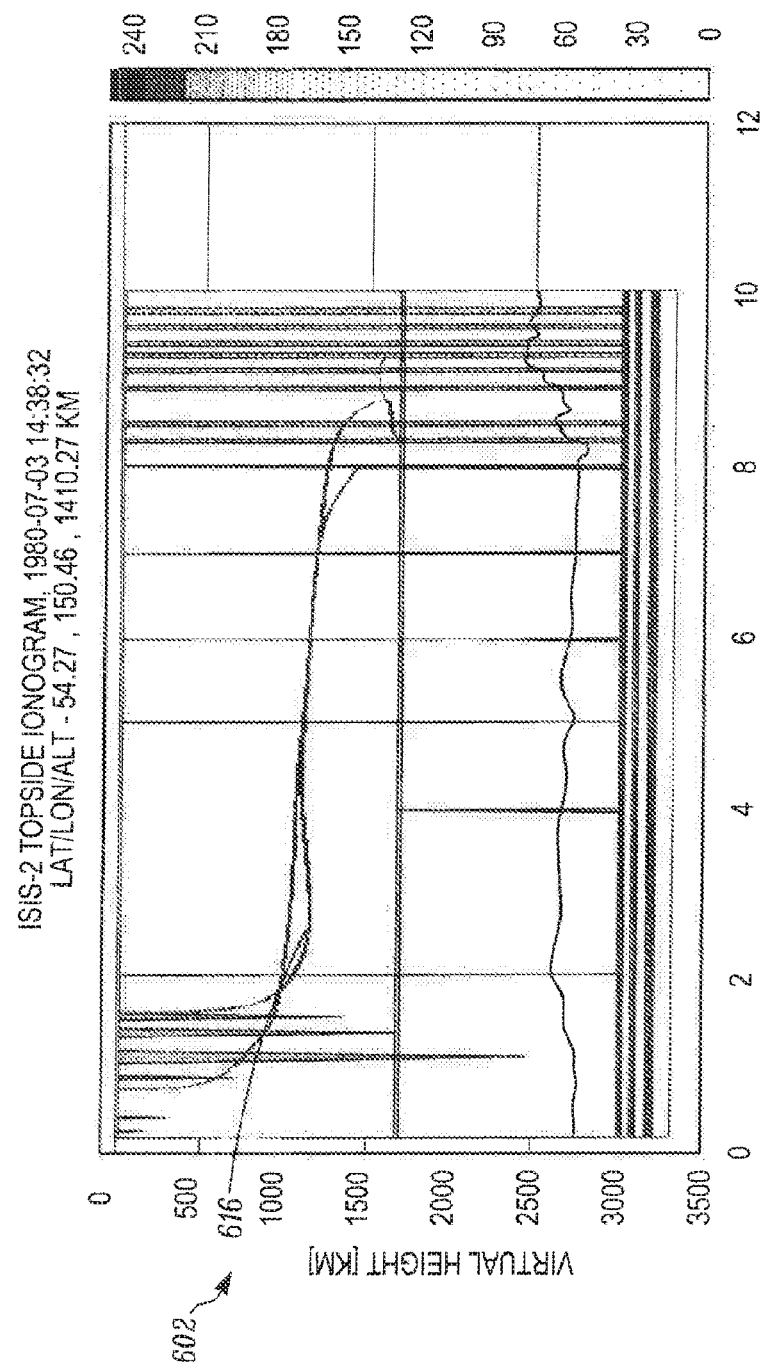
FIG. 6A illustrates a graph of a topside ionogram according to Example 1 of the invention.
Figure 6B:
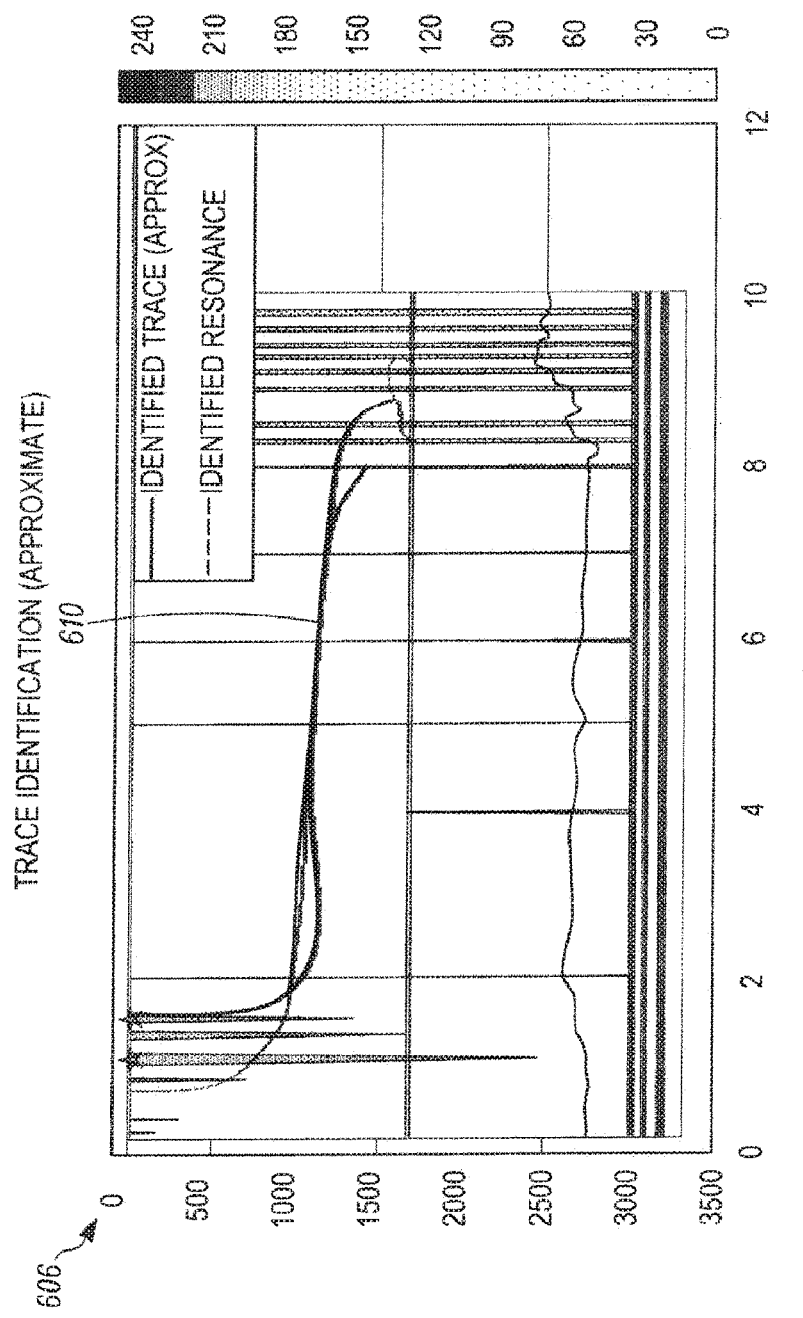
FIG. 6B illustrates a graph of a trace identification according to Example 1 of the invention.
Figure 6C:
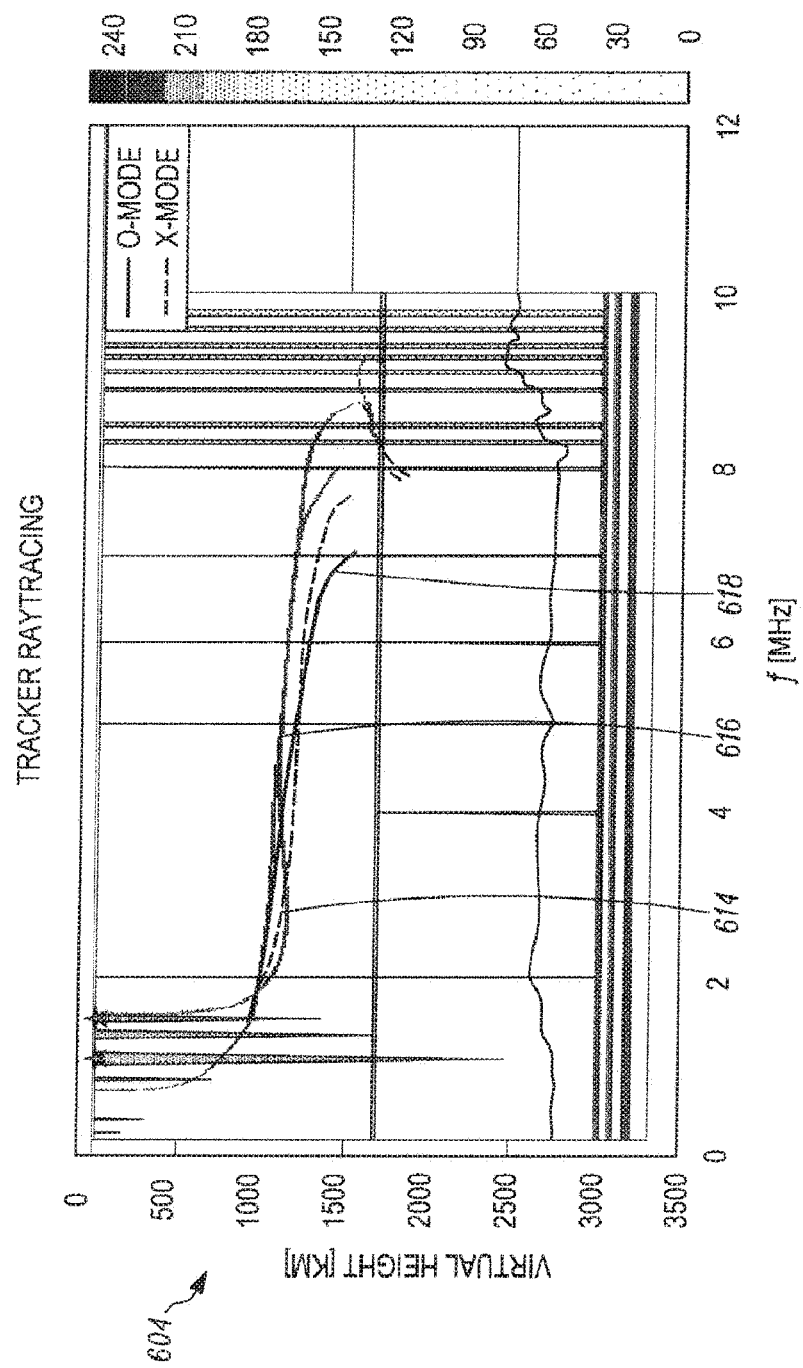
FIG. 6C illustrates a graph of a TRACKER Raytracing according to an Example 1 of the invention.
Figure 6D:
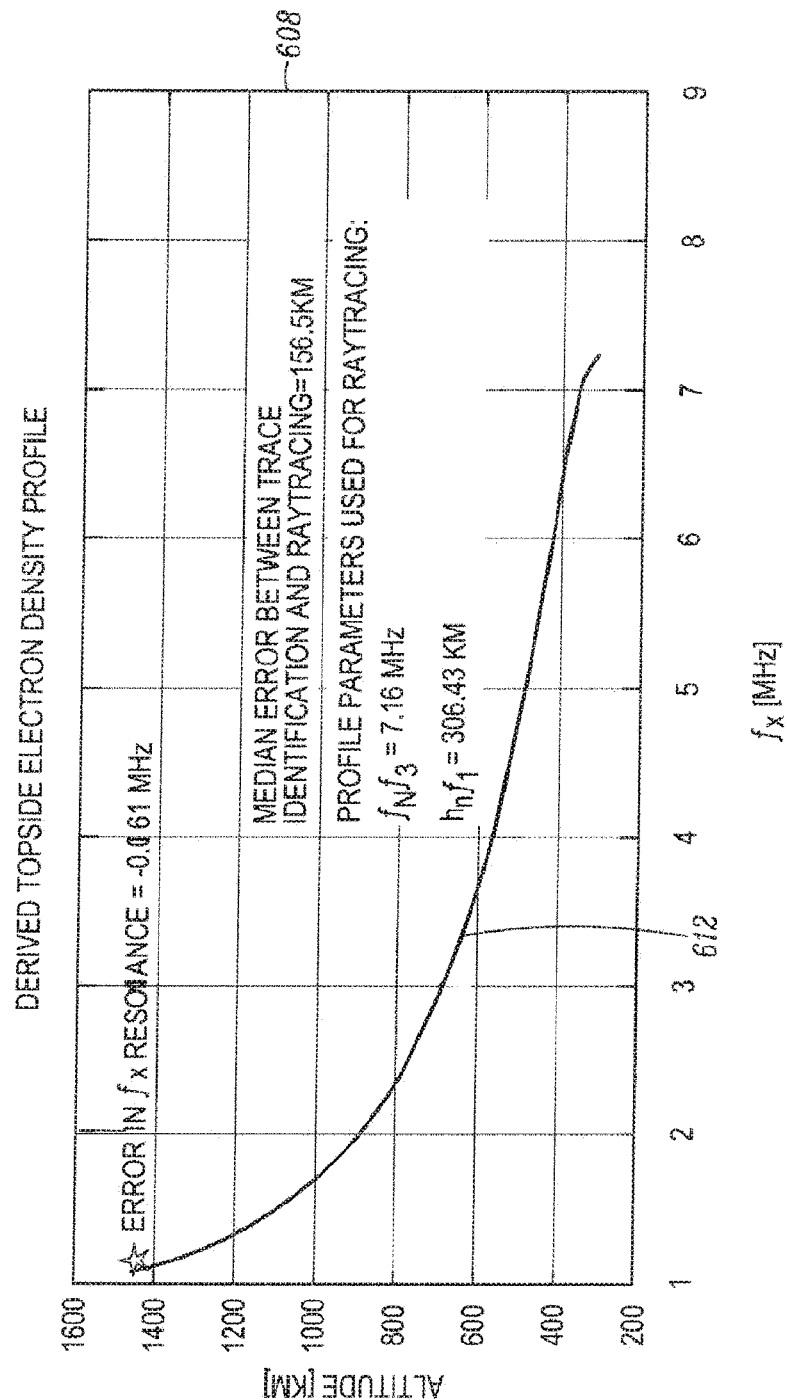
FIG. 6D illustrates a derived topside electron density profile according to Example 1 of the invention.

FIG. 6A illustrates a graph of a topside ionogram according to Example 1 of the invention. FIG. 6B illustrates a graph of a trace identification according to Example 1 of the invention. FIG. 6C illustrates a graph of a TRACKER Raytracing according to an Example 1 of the invention. FIG. 6D illustrates a derived topside electron density profile according to Example 1 of the invention.

Referring FIGS. 5 to 6D, showing an illustrative example of raw sounder data, presented as an image 602. The data represented in image 602 is input into the processing module 502 to remove various noise sources as described herein, e.g., in 406 and 408) and also for peak detection, step 410. The output 514 of module 502 is configured to be received by the autoscaling and extraction module 504.

The output 516 of the autoscaling and extraction module 504 includes data indicative of a matrix Z, e.g., 512×512, which is depicted graphically as a plot 606 as FIG. 6B. Referring to FIG. 6B, the plot 606 illustrates a trace 610 arranged on the raw data of 602 line 616 in graphical representation 606. This is done for comparison between the two traces 616 and 610. The initialization for inversion module 508 processes data, e.g., matrix Z, input 516 in a virtual ray tracing step 518, VI inversion step 522, and generating the Initial Ne Profile step 526 in order to parameterize the initial electron density as $h_mF_2$=306.43 km and $N_mF_2$=6.36×10$^5$ cm$^{-3}$, which maps to $f_oF_2$=7.16 MHz. The steps 518, 522, and 526 are discussed herein. This profile, parameterized by $h_mF_2$ and $N_mF_2$, is shown in FIG. 6D as plot 608 having a trace 612. Note that the parameters for the E and F$_1$ regions, $h_mE$, $N_mE$, $h_mF_1$, and $N_mF_1$ are 0, because the topside sounding technique does not retrieve information from these regions.

Next, the $h_mF_2$ and $N_mF_2$ parameters are passed to module 506 and step 530 in order to develop an OI ionogram with the TRACKER ray tracing program, producing the $Z^{k=0,OI}$ matrix, which is output 532 to step 534. Here, the iteration number, k, is set to k=0 due to the initial iteration. The results of $Z^{k=0,OI}$ are shown in FIG. 6C as plot 604 including a red trace 614, yellow trace 618, again overlaid on the original sounder data represented as trace 618.

Next in step 534, $\Delta Z$ is calculated by comparing Z and $Z^{k=0,OI}$ for an OI match. In addition, the median difference value of $\Delta Z$, median($\Delta Z$), and select the threshold distance criteria as $d_{criteria,MS}$=7.6 km is calculated. In step 534, the calculated median($\Delta Z$) is 156.5 km and displayed in FIG. 6D. In step 537, it is determined whether the comparison metric is satisfied. In order to pass the comparison metric: median($\Delta Z$)<$d_{criteria}$. In this case, the comparison metric is not satisfied. Therefore, the output is sent to Adust Ne module 540 and to adjust the profile parameters $h_mF_2$ and $N_mF_2$, increment k, and the process in steps 530, 534, and 537 are repeated.

Figure 7:
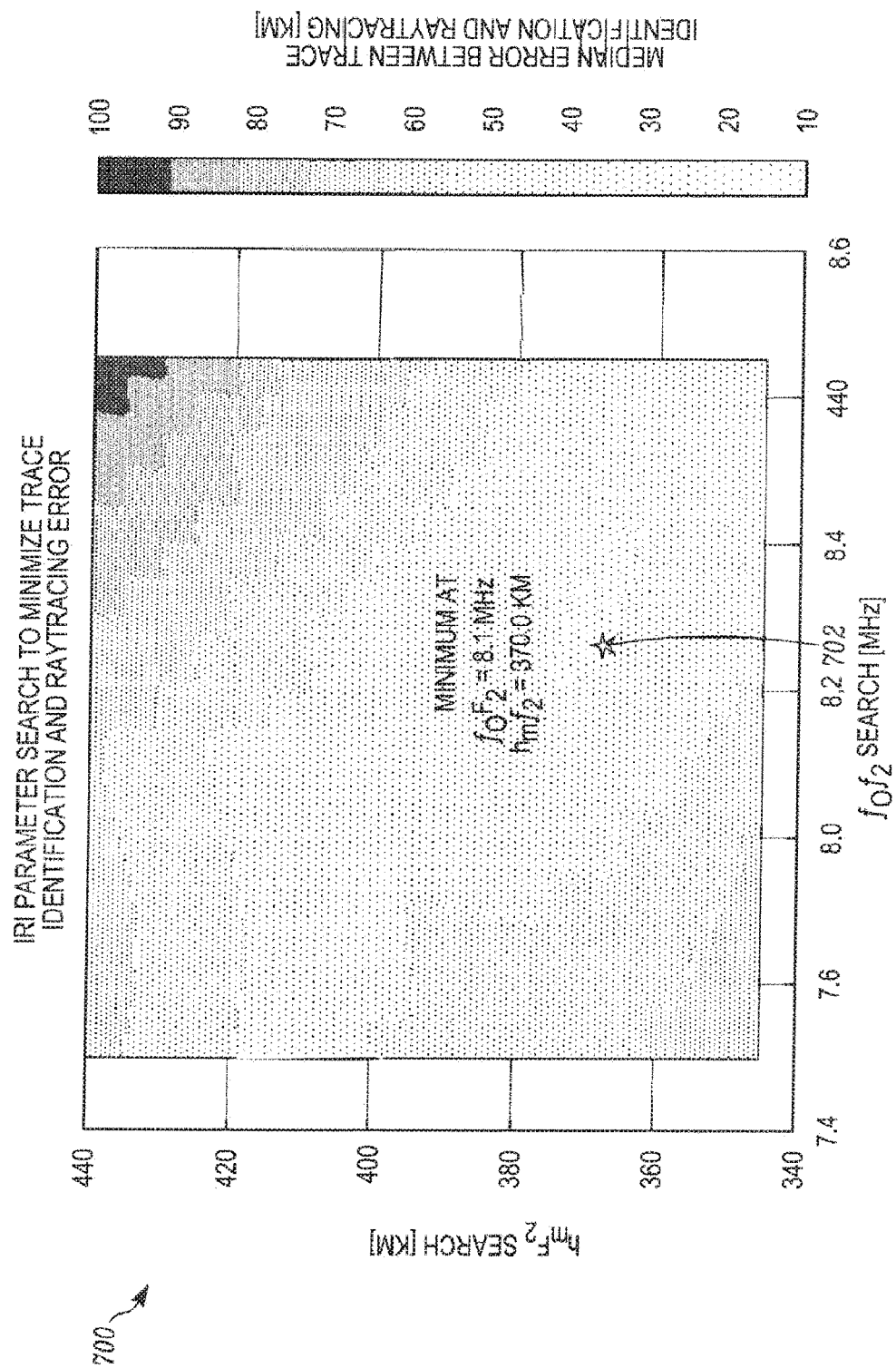
FIG. 7 illustrates an electron density Chapman profile parameter search to minimize trace identification according to Example 1.

FIG. 7 illustrates an electron density Chapman profile parameter search to minimize trace identification according to Example 1.

Referring to FIG. 7, the plot 700 includes a number of k iterations that can take place as the iterative ray processing converges to meet the comparison metric. Here, the x-axis shows the $f_oF_2$ [MHz] search, which is mapped to $N_mF_2$ via the equation: $N_mF_2$=($f_oF_2$ [MHz]/8.98e-3)$^2$ [cm$^{-3}$]) and the y-axis is the $h_mF_2$ search space. Both the $f_oF_2$ search space and $N_mF_2$ search space are nominally 19 values each, for a total of 361 ($h_mF_2$, $N_mF_2$) pairs. A ($h_mF_2$, $N_mF_2$) pair is considered a k iteration in via module 506, and the colorbar axis represents the Comparison Metric of each parameter set, median ($\Delta Z$) in step 537. One can view each $h_mF_2$, $N_mF_2$ pair in FIG. 7 as one iteration, k, of the search space (for a total of 361 searches in this example), each producing results similar to that in FIG. 1 (not shown). Note that for the set ($h_mF_2$, $N_mF_2$)=(370 [km], 8.1×10$^5$ [cm$^{-3}$]), located as the white star 702 in FIG. 7, the median error between the trace identification and ray tracing, median($\Delta Z$)<7.5 [km]<$d_{criteria, MS}$=7.6 [km]. Therefore, the path in 539 is taken due to a successful criteria match for the set ($h_mF_2$, $N_mF_2$)=(370 [km], 8.1×10$^5$ [cm$^{-3}$]).

Figure 8A:
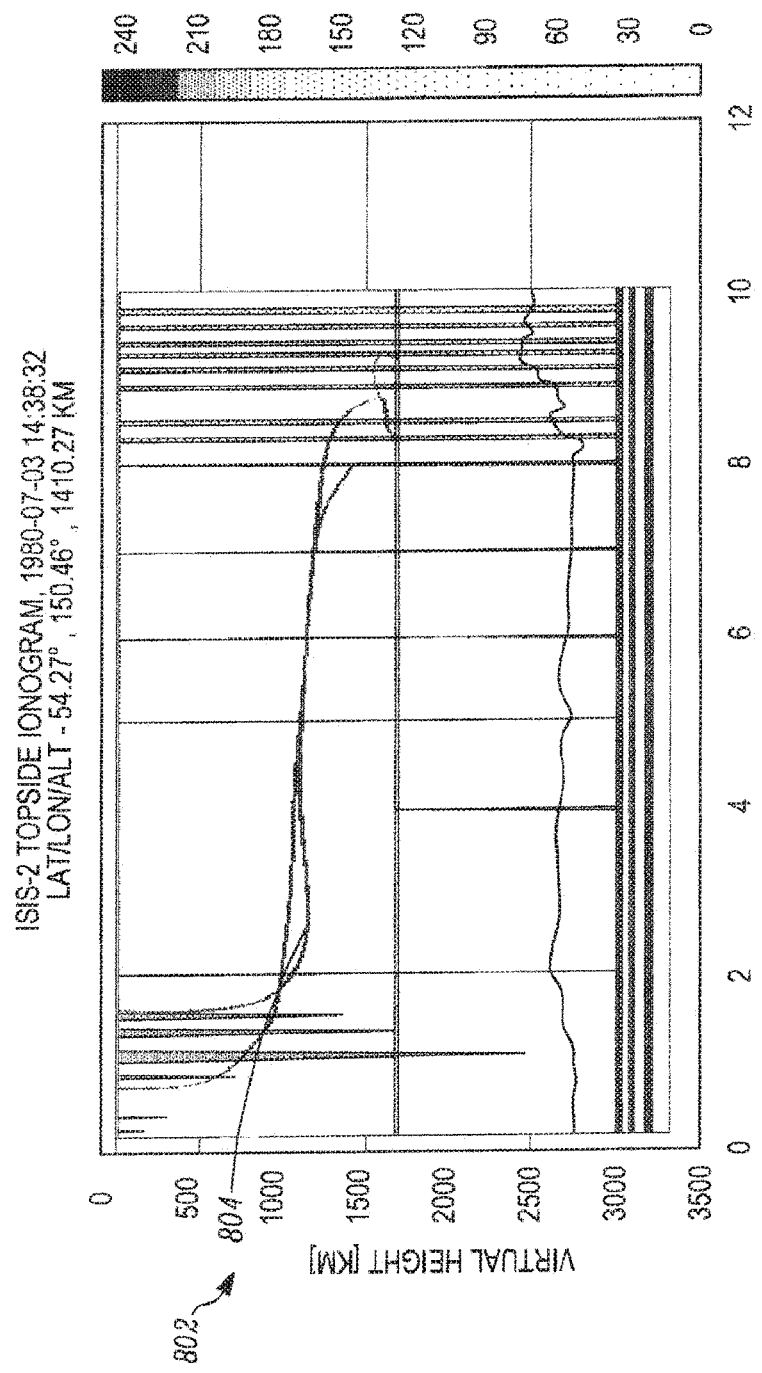
FIG. 8A illustrates a graph of a topside ionogram according to Example 1 of the invention.
Figure 8B:
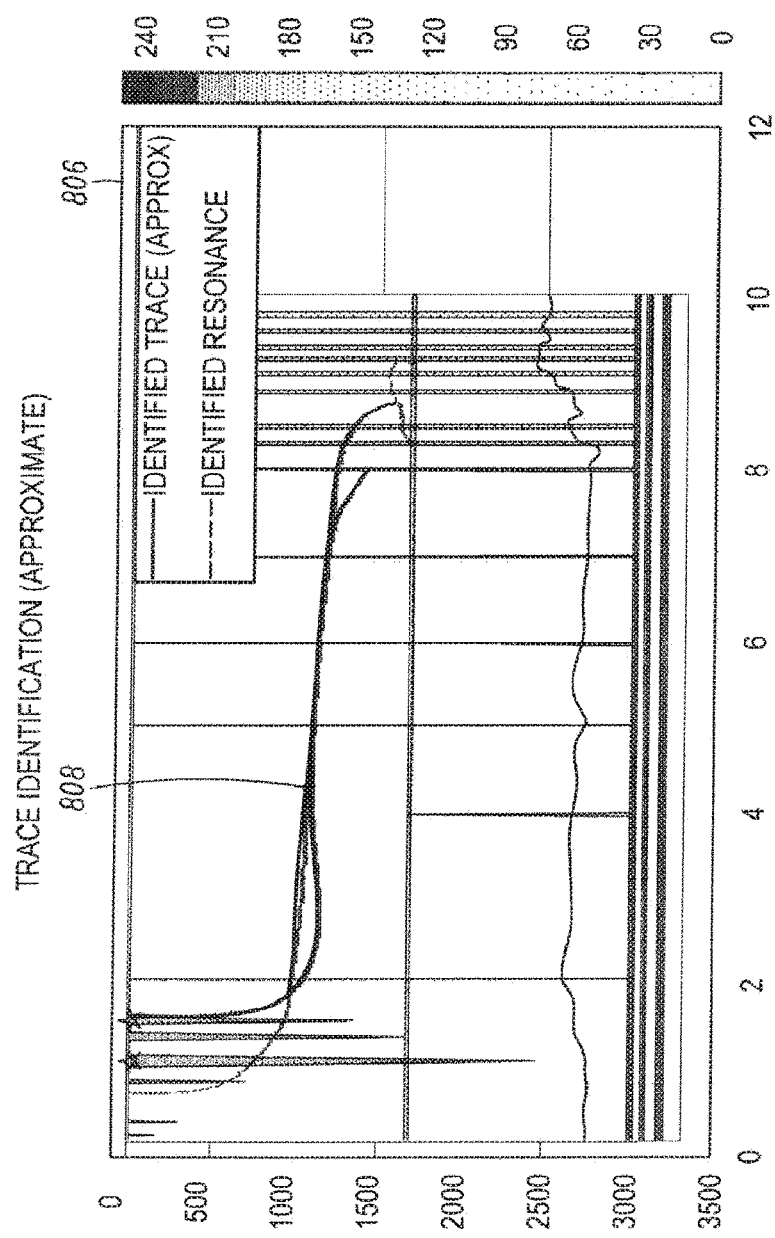
FIG. 8B illustrates a graph of a trace identification according to Example 1 of the invention.
Figure 8C:
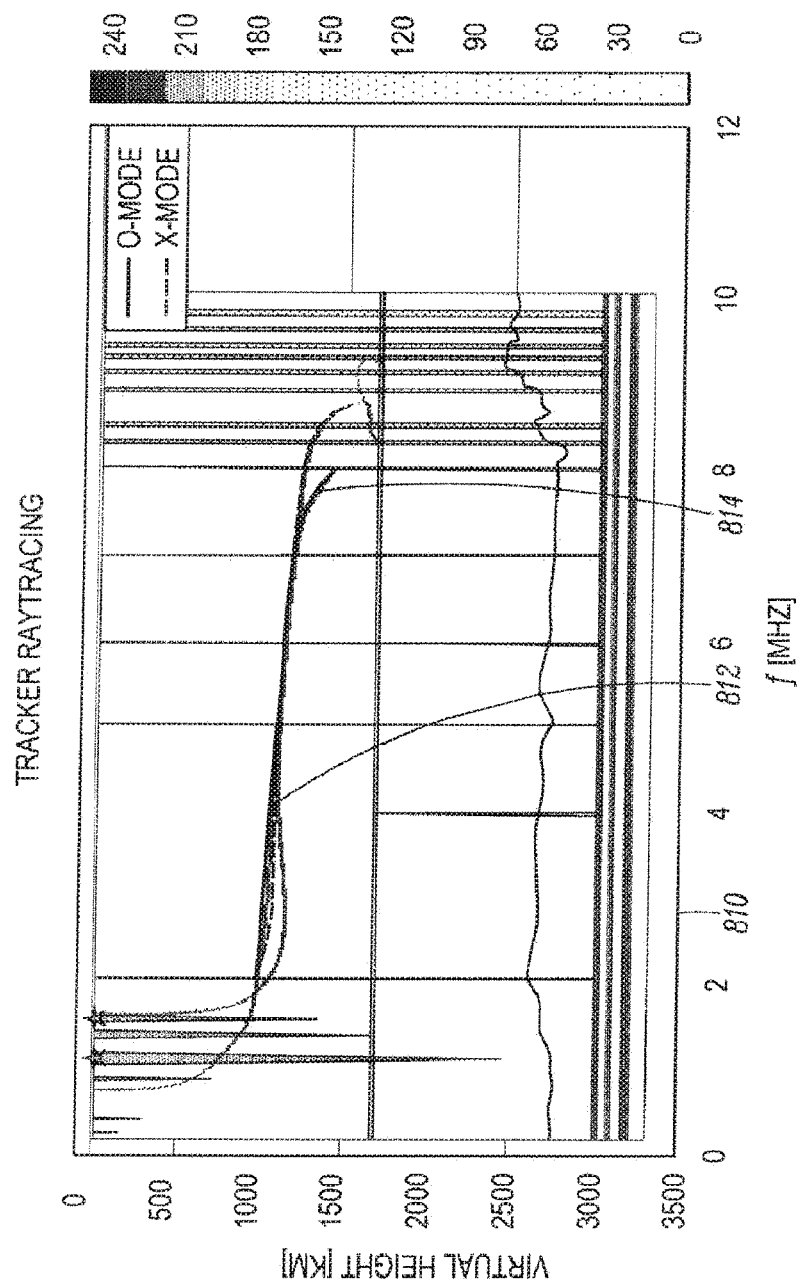
FIG. 8C illustrates a graph of a TRACKER Raytracing according to an Example 1 of the invention.
Figure 8D:
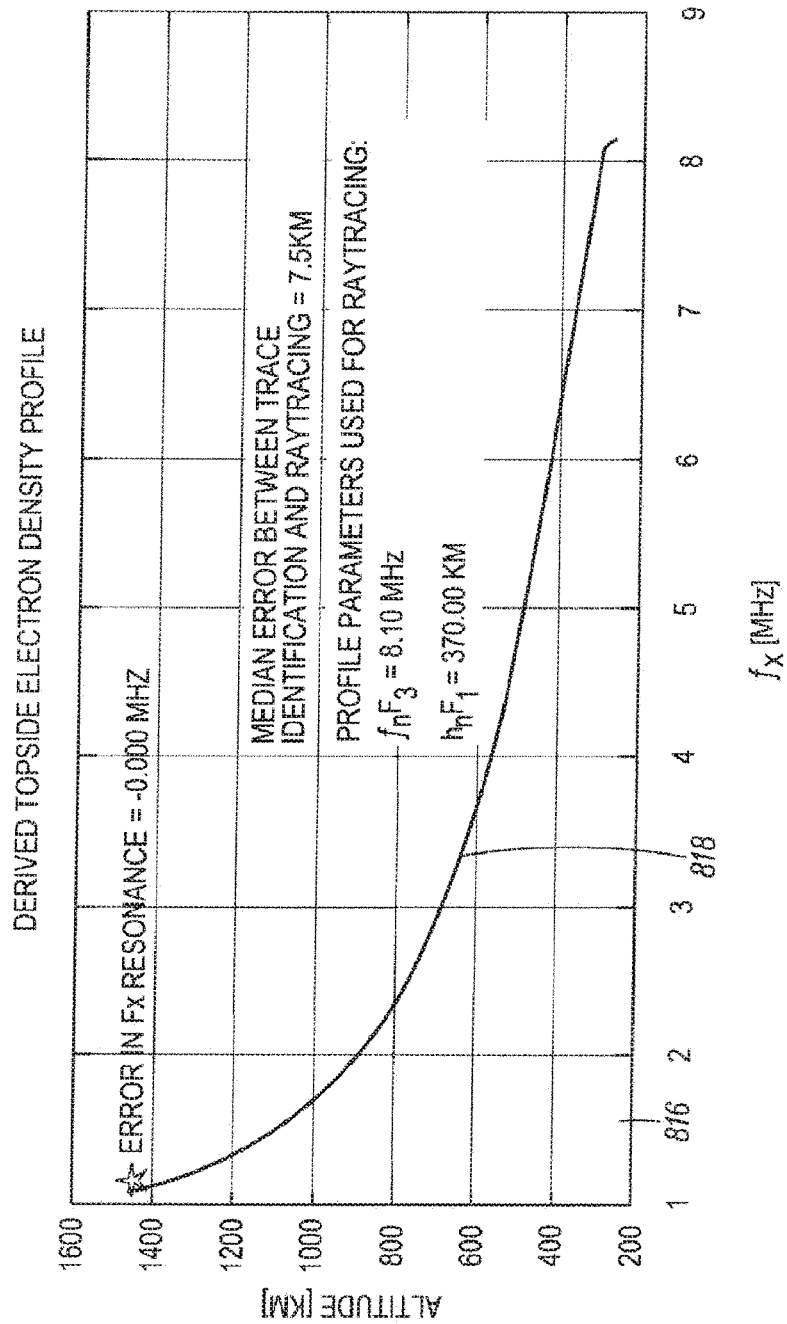
FIG. 8D illustrates a derived topside electron density profile according to Example 1 of the invention.

FIG. 8A illustrates a graph of a topside ionogram according to Example 1 of the invention. FIG. 8B illustrates a graph of a trace identification according to Example 1 of the invention. FIG. 8C illustrates a graph of a TRACKER Raytracing according to an Example 1 of the invention. FIG. 8D illustrates a derived topside electron density profile according to Example 1 of the invention.

Referring to FIGS. 8A-8D, 802 is an illustration showing raw sounder data and 804 is a trace. The output 516 of the autoscaling and extraction module 504 includes data indicative of a matrix Z, e.g., 512×512, which is depicted graphically as a plot 808 as FIG. 8B. 806 is trace identification plot and 808 is the trace for comparison with FIG. 8B, plot 808 and trace 806 as discussed herein. The results of $Z^{k=n,OI}$ are shown in FIG. 8C as the plot 810 having red trace 812 and yellow trace 814, again overlaid on the original sounder data represented as trace 804 and obtained as described herein. In FIG. 8D the final results from an iterative process of 500 is shown. The results illustrate a successful criteria match for the set ($h_mF_2$, $N_mF_2$)=(370 [km], 8.1×10$^5$ [cm$^{-3}$]) in step 537. FIGS. 6A-6D are similar, but for $h_mF_2$, $N_mF_2$ parameters that satisfy the Comparison Metric of step 537. The electron density retrieved from the TRACKER input is shown in FIG. 8D, and the retrieval of Ne Profile metrics of step 548 is illustrated graphically in FIG. 8D. Note that the modeled iterative ray tracing data, $Z^{k,OI}$, matches the data Z of input 510, fairly well, representative of median($\Delta Z$)<7.5 [km]=$d_{criteria, MS}$ as output 539. This $\Delta Z$ in FIG. 8D is much less than the $\Delta Z$ of FIG. 6D, thereby providing enhanced accuracy of the model.

In summary, we have taken measurements from the HF sounder, iteratively ray traced modeled ionospheres and selected the best one (here, 'best' is defined as meeting the Comparison Metric), and as a result, solved for the underlying electron density profile as shown in FIG. 8D.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of iterative ray tracing, comprising the steps of:
   transmitting, from a transmitter at a first location, a swept signal into a portion of the ionosphere;
   receiving, at a receiver positioned at a second location, a reflection of the swept signal;
   at a computing system connected to the receiver:
      receiving a first input comprising data indicative of an oblique incidence (OI) ionogram based on the reflection of the swept signal;
      reducing at least one of noise and other spurious signals in the data to programmatically produce a first output comprising first output data;
      autoscaling the first output data to programmatically produce a second output comprising data indicative of a substantially separated O-trace and an X-trace;
      iteratively processing the second output to programmatically predict the electron density profile over a measurement region associated with the portion of the ionosphere, wherein iteratively processing the second output comprises:
         determining a vertical incidence (VI) ionogram based on the second output;
         determining an initial electron density profile based on the VI ionogram;
         determining a constructed OI ionogram based on the initial electron density profile;
         determining that a difference between the constructed ionogram and second output exceeds a threshold; and
         adjusting one or more parameters of the initial electron density profile based on the difference between the constructed ionogram and second output; and
      outputting a predicted electron density profile.

2. The method of claim 1, wherein the transmitter and receiver form at least part of an HF sounder system.

3. The method of claim 1, wherein the iteratively processing the second output step further comprises the step of comparing the second output against a predetermined criteria.

4. A system for iterative ray tracing, the system comprising:
   a transmitter positioned at a first location and configured to transmit a swept signal into a portion of the ionosphere;
   a receiver positioned at a second location and configured to receive the swept signal from the transmitter;
   a computing system connected to the receiver, the computing system comprising one or more processors and a memory storing instructions, which when executed by the one or more processors, cause the computing system to:
      receive a first input comprising data indicative of an OI ionogram;
      reduce at least one of noise and other spurious signals in the data to programmatically produce a first output comprising first output data;

autoscale the first output data with an autoscaling and extraction module to programmatically produce a second output comprising data indicative of a substantially separated O-trace and an X-trace; and iteratively process the second output to programmatically predict the electron density profile over a measurement region associated with the portion of the ionosphere, wherein iteratively processing the second output comprises:

determining a vertical incidence (VI) ionogram based on the second output;

determining an initial electron density profile based on the VI ionogram;

determining a constructed OI ionogram based on the initial electron density profile;

determining that a difference between the constructed ionogram and second output exceeds a threshold; and adjusting one or more parameters of the initial electron density profile based on the difference between the constructed ionogram and second output; and output a predicted electron density profile.

\* \* \* \* \*